(12) United States Patent
Gordy et al.

(10) Patent No.: US 8,857,289 B2
(45) Date of Patent: Oct. 14, 2014

(54) TRANSMISSION CABLE ASSEMBLY FOR HIGH TEMPERATURE ENVIRONMENTS

(75) Inventors: Donald Gene Gordy, Moberly, MO (US); Kent Birt, Hannibal, MO (US)

(73) Assignee: Dura Operating, LLC, Auburn Hills, MI (US)

( * ) Notice: Subject to any disclaimer, the term of this patent is extended or adjusted under 35 U.S.C. 154(b) by 0 days.

(21) Appl. No.: 11/733,841

(22) Filed: Apr. 11, 2007

(65) Prior Publication Data

US 2008/0250892 A1 Oct. 16, 2008

(51) Int. Cl.
| | |
|---|---|
| *F16H 61/36* | (2006.01) |
| *F16C 1/14* | (2006.01) |
| *F16C 1/10* | (2006.01) |
| *F16C 1/22* | (2006.01) |
| *F16C 11/04* | (2006.01) |
| *F16C 1/26* | (2006.01) |
| *F16C 1/08* | (2006.01) |

(52) U.S. Cl.
CPC ............ *F61H 61/36* (2013.01); *F16C 2361/65* (2013.01); *F16C 2326/01* (2013.01); *F16C 1/10* (2013.01); *F61C 1/105* (2013.01); *F16C 1/226* (2013.01); *F16C 11/04* (2013.01); *F16C 1/262* (2013.01); *F16C 1/108* (2013.01); *F16C 1/14* (2013.01); *F16C 1/223* (2013.01)
USPC .......................................... 74/502.6; 74/502.4

(58) Field of Classification Search
CPC .................................... F16C 1/14; F16C 1/08
USPC .................... 74/502.4, 502.6, 500.5
IPC .......................................................... F16C 1/10
See application file for complete search history.

(56) References Cited

U.S. PATENT DOCUMENTS

| | | | |
|---|---|---|---|
| 4,212,696 A * | 7/1980 | Lusk et al. ..................... | 156/294 |
| 5,303,610 A | 4/1994 | Noel et al. | |

(Continued)

FOREIGN PATENT DOCUMENTS

| | | |
|---|---|---|
| DE | 1111525 B | 7/1961 |
| DE | 3924549 A1 | 2/1991 |

(Continued)

OTHER PUBLICATIONS

European Search Report for EP 05254134.

(Continued)

*Primary Examiner* — Troy Chambers
*Assistant Examiner* — Terence Boes
(74) *Attorney, Agent, or Firm* — Gifford, Krass, Sprinkle; Kevin MacKenzie; Dean Watson

(57) ABSTRACT

Automotive push-pull type transmission shift cable assemblies are disclosed that meet new specifications for extended performance at high temperatures, including certain embodiments suitable for use at elevated temperatures of at least 165° C. The cable comprises a conduit and a core wire extending through the ends of the conduit to a shifter end portion and transmission end portion. The transmission end portion comprises a core wire length adjuster and a conduit end fitting. The core wire length adjuster comprises a core wire adjuster isolator and a retainer cap. At least certain embodiments of the transmission shift cable assemblies pass one or a combination of the following tests:
  a. Lash 200,000 Cycles Test,
  b. Attachment Pin Installation 200,000 Cycles Test,
  c. Attachment Pin Extraction 200,000 Cycles Test, and
  d. Cable Efficiency Test
  e. In-Vehicle Routing 165° C. Cable Strength Test.

19 Claims, 10 Drawing Sheets

(56) References Cited

U.S. PATENT DOCUMENTS

| | | | |
|---|---|---|---|
| 5,884,531 A | 3/1999 | Koenig | |
| 6,295,886 B1* | 10/2001 | Russell | 74/473.18 |
| 7,353,728 B2* | 4/2008 | Ruhlander et al. | 74/502 |
| 2002/0104402 A1* | 8/2002 | Ruhlander | 74/502.4 |
| 2004/0158173 A1* | 8/2004 | Voegele et al. | 600/568 |
| 2005/0186024 A1 | 8/2005 | Ruhlander | |
| 2006/0006144 A1* | 1/2006 | Moore | 218/150 |
| 2006/0012199 A1* | 1/2006 | Slank | 294/150 |
| 2006/0053945 A1* | 3/2006 | Reynolds et al. | 74/502.5 |
| 2008/0250892 A1 | 10/2008 | Gordy | |

FOREIGN PATENT DOCUMENTS

| | | |
|---|---|---|
| EP | 1384906 A | 1/2004 |
| EP | 1387095 A | 2/2004 |
| EP | 1469209 A | 10/2004 |
| EP | 1630429 A | 3/2006 |
| EP | 1640204 A | 3/2006 |
| GB | 583883 A | 1/1947 |
| GB | 603675 A | 6/1948 |
| WO | 2006/016962 A2 | 2/2006 |
| WO | 2009/064690 A1 | 5/2009 |

OTHER PUBLICATIONS

International Search Report and Written Opinion from related PCT/US2008/060829.

Examination Report dated Apr. 26, 2011, with Examiner's e-mail dated Jun. 27, 2011, issued for corresponding European Patent Application No. 08746275.0.

* cited by examiner

Transmission Shift Cable Assembly For Elevated Temperatures

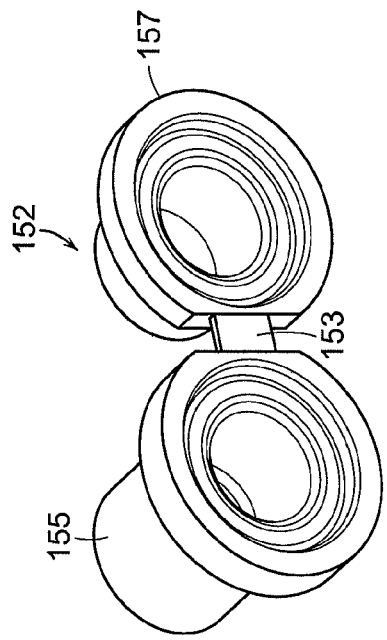
FIG. 15
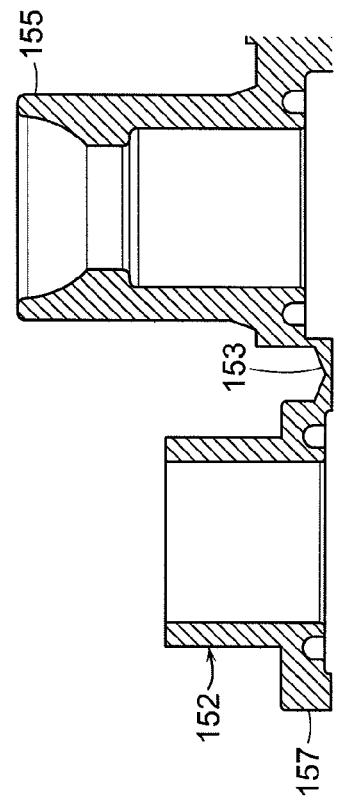
FIG. 16
FIG. 13
FIG. 14
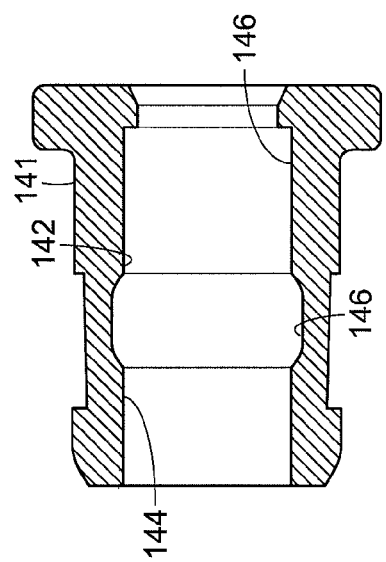

TRANSMISSION CABLE ASSEMBLY FOR HIGH TEMPERATURE ENVIRONMENTS

FIELD OF THE INVENTION

The present invention relates to motor vehicle transmission shift cable assemblies, and to components of such cable assemblies, and in particular to cable assemblies and components suitable for meeting elevated temperature specifications.

BACKGROUND OF THE INVENTION

Motion-transmitting remote control cable assemblies suitable for transmitting force and motion, such as push-pull cables or Bowden cables, are used as motor vehicle transmission shift cable assemblies. A transmission shift cable assembly typically includes a flexible core element (the core wire or core or strand) slidably enclosed within a flexible outer sheath (the conduit). A conduit end fitting is at each end of the conduit, and the core extends through the conduit end fittings (also referred to as conduit fittings). In some designs, for example, at one end of the cable assembly (the shifter end), the core wire attaches to the transmission shifter selector in the cabin or passenger compartment of the vehicle, typically via a rod end fitting attached to that end of the core wire. In some designs, e.g., the cable resides in the driveline tunnel. In the driveline tunnel, engine compartment, etc., at or near the second end of the cable assembly (the transmission end), the core wire attaches to a controlled member of the motor vehicle's transmission, e.g., a movable lever acting as the gear selector arm or the like of the transmission. This end of the cable assembly typically must withstand a harsh environment during vehicle operation, often including elevated temperatures. A fitting at the transmission end, optionally referred to as a terminal sub-assembly, in some cases includes a core wire length adjuster attached to the transmission. The core wire length adjuster is used to adjust the length of the core wire, e.g., during original assembly of the vehicle or during maintenance or repair service to account for manufacturing tolerances build-up (or "build variations") and the like. The terminal sub-assembly at the other end is secured to an actuator, i.e. a shift lever or other control member. Typically, the actuator and the controlled member each has a mounting pin, alternatively referred to as an attachment pin, e.g., a ball stud type attachment pin or a tapered pin or other suitable feature at a mounting point for suitable connection to the cable assembly, such that the cable assembly is able to transfer load or motion between the two mounting points. That is, moving the shift lever or other actuator member transmits force/motion via longitudinal movement of the strand within the sheath, to correspondingly move the controlled member and so shift the transmission. Each conduit fitting attaches to a corresponding bracket or other mounting fixture, support structure or the like, and a grommet may be used between them at the firewall separating the engine compartment or driveline tunnel from the passenger compartment.

The strand of a motion-transmitting cable assembly and its attachment pins and other mounting components can collectively have a relatively large dimensional tolerance range due to manufacturing variations and the like. In automobile transmission shift systems, this can result in a significant difference in fit and from one unit to the next, resulting in the possibility of relative movement between the fitting and the pin referred to as lash. In certain cases lash causes inaccuracy in the functioning of the transmission shift system. Additionally, these known terminal assemblies often have large installation loads (the forces required to attach the terminal sub-assembly to the pin or other mounting component) in order to obtain correspondingly high extraction loads (the forces required to remove the terminal sub-assembly from the pin or other mounting component). Traditionally, the problem of lash is mitigated by the use of an isolator at the interconnection between the pin and the terminal sub-assembly, designed to absorb vibration. Isolators must be made of a soft, resilient material that has significant give or resiliency to absorb the vibration, and as a result they can suffer wear and breakdown in areas were the force or load is concentrated, i.e. where the pin contacts the isolator. The material of the isolator, however, must be adequately resistant to deflection or compression set over extended usage periods.

The problems associated with controlling lash and installation and extraction forces are exacerbated by the harsh operating conditions at the transmission, typically inside a motor vehicle engine compartment or driveline tunnel, including, for example, the high temperatures which routinely occur inside the engine compartment and driveline tunnel. Present day specifications require some motor vehicle transmission cable assemblies at the transmission end, i.e., in the engine compartment or driveline tunnel, to function properly over extended use at 149° C. or lower. Because much of the heat given off around the transmission is directional, present day technology is to shield the cable from high heat instead of opting to change the cable. However, it has been discovered by the inventors hereof that such a solution is not optimal.

Accordingly, there is a need for improved transmission shift cable assemblies and components, which are suitable to meet more stringent conditions mentioned above for transmission shift cable assemblies, account for dimensional tolerance ranges of mating components, and are operative to reduce vibration during operation. There is also a need for motion transmitting remote control cable assemblies and end fitting for such cable assemblies, which require relatively low installation loads while maintaining relatively high extraction loads. There is also a need for motion transmitting remote control cable assemblies and end fittings for same, resistant to wear or breakdown at the area of the interconnection between the terminal sub-assembly and a mounting pin. There is also a need for terminal assemblies that are economical and simple to assemble and install with proper orientation.

It is an object of the present invention, to provide transmission shift cable assemblies and components addressing one or a combination of the above requirements or problems. Additional objects of at least certain embodiments of the present invention will become apparent to those skilled in the art from the following disclosure and detailed description of exemplary embodiments

SUMMARY

In accordance with one aspect, an automotive transmission shift cable assembly comprises a conduit subassembly comprising a conduit and a core wire extending through the conduit. The cable assembly further comprises a shifter end portion connected to the core wire and a transmission end portion connected to the core wire. The shifter end portion comprises a conduit end portion polymeric isolator and a core wire adjuster polymeric isolator. The automotive transmission shift cable assembly is performance stable at 165° C. As the term is used here, an automotive transmission shift cable assembly is "performance stable at 165° C." if it has the characteristics of meeting the following performance tests, described further below:

Lash 100,000 Cycles Test,

Certain exemplary embodiments of such automotive transmission shift cable assemblies have the further characteristics of being able to meet one or more of the following additional performance tests, described further below:

Cable Efficiency Test, and

In-Vehicle Routing 165° C. Cable Strength Test. Attachment Pin Installation 200,000 Cycles Test, and Attachment Pin Extraction 200,000 Cycles Test.

In certain exemplary embodiments of such automotive transmission shift cable assemblies, the core wire adjuster polymeric isolator has a retainer cap socket and a connector pin socket portion, and the transmission end portion further comprises a polymeric retainer cap:

configured to be partially received by the retainer cap socket of the core wire adjuster polymeric isolator, and having a connector pin end socket configured to receive and engage a portion of a connector pin received into the connector pin socket portion of the core wire adjuster polymeric isolator.

In certain exemplary embodiments the performance stable automotive transmission shift cable assemblies have the further characteristics of meeting the following tests:

Lash 200,000 Cycles Test,

Attachment Pin Installation 200,000 Cycles Test, and

Attachment Pin Extraction 200,000 Cycles Test.

In accordance with another aspect, automotive transmission shift cable assemblies are provided that have extended performance at high temperatures, including at least 165° C., and comprise a push-pull type cable, a shifter end portion and a transmission end portion. The cable, specifically, the conduit subassembly, comprises a conduit and a core wire or strand extending through the ends of the conduit to the shifter end portion and transmission end portion. The transmission end portion comprises a core wire length adjuster and a conduit end fitting. The core wire length adjuster comprises a core wire adjuster isolator and a retainer cap. The core wire adjuster isolator forms a bore having a connector pin socket portion and a retainer cap socket portion and comprises a material that will give extended performance at elevated temperature without significant deformation or embrittlement. Example materials that could be used include silicone, thermoplastic elastomer (TPE), thermoplastic polyester elastomer (TPEE), polyester-type thermoplastic polyurethane compound and others. In certain exemplary embodiments the adjuster isolator is formed entirely of polyester-type thermoplastic polyurethane, either filled or unfilled with particulate material. The retainer cap comprises suitable material such as polyether imide thermoplastic (PEI), Nylon 6 thermoplastic (polyamide 6), Nylon 66 thermoplastic (polyamide 66) (alternative versions) and the like, e.g., glass-filled Nylon 6/6. The retainer cap is configured to be partially received by the retainer cap socket of the core wire adjuster isolator, and has a connector pin end socket configured to receive and engage a portion of a connector pin, e.g., a free end of the connector pin. In certain exemplary embodiments the retainer cap is formed entirely of glass-filled Nylon 6/6. The conduit end fitting comprises a conduit end fitting isolator. In certain exemplary embodiments the conduit end fitting comprises a sleeve secured about an exterior of the conduit, the conduit end fitting isolator being positioned over at least a portion of the sleeve, and a conduit end fitting cap over at least a portion of the isolator, and a conduit end fitting abutment over at least a portion of the conduit end fitting isolator and engaging the conduit end fitting cap. Optionally, a swivel tube extends from within the abutment and has a longitudinal bore through which the core wire extends toward the core wire length adjuster. The abutment component typically is configured as a single piece which mates with or to an attachment bracket. The attachment bracket may be an extension from, bolted to or otherwise positioned near the transmission housing or vehicle body, etc. The conduit end fitting isolator comprises suitable material such as thermoplastic elastomer (TPE), polymeric silicone compound, thermoplastic polyurethane elastomer (unspecified) (TPU), thermoplastic polyurethane elastomer (polyester) (TPU-polyester) and the like, e.g., materials meeting ASTM D2000 M3GE508 Z2, such as polymeric silicone compound meeting ASTM D2000 M3GE508 Z2. The polymer in certain exemplary embodiments substantially maintains its durometer or hardness at 165° C. over extended periods of usage, e.g., months or one or more years. If the material deviates excessively much from the original durometer, unwanted amount of lash may occur in the installed cable assembly. In certain exemplary embodiments the conduit end fitting isolator has the characteristic of maintaining its durometer to the extent of degrading less than 20% or even less than 10%, such as less than 5% at 165° C. over months or in some cases even over one or more years or automotive usage. In certain exemplary embodiments the conduit end fitting isolator comprises a polymeric silicone compound which has the characteristic in that usage form, of maintaining its durometer to the extent of degrading less than 20% or even less than 10%, such as less than 5% at 165° C. over months or in some cases even over one or more years or usage. In certain exemplary embodiments the conduit end fitting isolator is formed entirely of polymeric silicone compound meeting ASTM D2000 M3GE508 Z2, either filled or unfilled with particulate material. In certain exemplary embodiments the material of the conduit end fitting isolator does not substantially deform in an amount to significantly increase lash after exposure to operating temperatures. At least certain embodiments of the transmission shift cable assemblies provide an advantageous solution to new, stringent requirements for the transmission end portion of an automotive transmission shift cable assembly. In at least certain exemplary embodiments no heat shield must be applied to the cable assembly, thereby affording an economical cable assembly more easily assembled and packaged into the vehicle, including the portion in the engine compartment or driveline tunnel of the motor vehicle.

In accordance with another aspect, automotive transmission shift cable assemblies as disclosed above are provided that provide extended performance at high temperatures of at least 165° C. In at least certain embodiments of the transmission shift cable assemblies, the transmission end portion passes one or more of the following tests (further described below):

Lash 100,000 Cycles Test,

Attachment Pin Installation 100,000 Cycles Test,

Attachment Pin Extraction 100,000 Cycles Test,

Cable Efficiency Test, and

In-Vehicle Routing 165° C. Cable Strength Test.

In at least certain embodiments of the transmission shift cable assemblies, the transmission end portion passes some or a combination of the following tests (further described below):

Lash 200,000 Cycles Test,

Attachment Pin Installation 200,000 Cycles Test,

Attachment Pin Extraction 200,000 Cycles Test,

Cable Efficiency Test, and

In-Vehicle Routing 165° C. Cable Strength Test.

In accordance with another aspect, an automotive transmission shift cable assembly comprises, in combination, a conduit subassembly comprising a conduit and a core wire extending through the conduit, a shifter end portion, and a transmission end portion. The core wire in certain exemplary embodiments extends beyond the ends of the conduit. The conduit subassembly extends from the shifter end portion to the transmission end portion. The transmission end portion comprises a core wire length adjuster and a conduit end fitting. The core wire length adjuster comprises a housing and a core wire adjuster isolator and retainer cap held by the housing. The core wire adjuster isolator comprises polyester-type thermoplastic polyurethane and forms a bore having a connector pin socket portion and a retainer cap socket portion. In certain exemplary embodiments the adjuster isolator is formed entirely of polyester-type thermoplastic polyurethane, either filled or unfilled with particulate material. The retainer cap is configured to be partially received by the retainer cap socket of the core wire adjuster isolator and has a connector pin end socket configured to receive and engage a portion of a connector pin received into the connector pin socket portion of the core wire adjuster isolator. The retainer cap comprises glass-filled Nylon 6/6. The conduit end fitting comprises a sleeve secured about an exterior of the conduit, a conduit end fitting isolator over at least a portion of the sleeve, a conduit end fitting cap over at least a portion of the isolator, a conduit end fitting abutment over at least a portion of the conduit end fitting isolator and engaging the conduit end fitting cap, and a swivel tube extending from within the abutment. The swivel tube has a longitudinal bore into which the core wire extends toward the core wire length adjuster. In certain exemplary embodiments the core wire terminates where it connects to a rod, e.g., a steel rod, inside the bore of the swivel tube. The conduit end fitting isolator comprises a polymeric silicone compound meeting ASTM D2000 M3GE508 Z1 Z2.

In accordance with another aspect, an automotive transmission shift cable assembly comprises, in combination, a conduit subassembly comprising a conduit and a core wire extending through and beyond the ends of the conduit, a shifter end portion, and a transmission end portion. The conduit subassembly extends from the shifter end portion to the transmission end portion. The transmission end portion comprises a core wire length adjuster and a conduit end fitting. The core wire length adjuster is at the end of the cable assembly and comprises a housing and a core wire adjuster isolator and retainer cap held by the housing. The core wire adjuster isolator is generally annular, made of soft plastic, and forms a central bore having a connector pin socket portion and a retainer cap socket portion. The core wire adjuster isolator comprises polyester-type thermoplastic polyurethane compound. In certain exemplary embodiments the core wire adjuster isolator is formed as a single piece of polyester-type thermoplastic polyurethane compound. The retainer cap is configured to be partially received by the retainer cap socket portion of the core wire adjuster isolator and has a connector pin end socket configured to receive and engage the end of a connector pin received into the connector pin socket portion of the core wire adjuster isolator. The retainer cap comprises 25%-50% glass-filled Nylon 6/6. In certain exemplary embodiments the retainer cap is formed as a single piece of 25%-50% glass-filled Nylon 6/6, such as 30%-35%, e.g., 33% glass-filled Nylon 6/6. The retainer cap and core wire adjuster isolator of embodiments according to this aspect of the disclosure are substantially concentric and have corresponding configurations operative to interlock with each other, at least when a connector pin from the transmission is received into the connector pin socket portion of the core wire adjuster isolator and the connector pin end socket of the retainer cap. The conduit end fitting comprises a sleeve over the end of the conduit, a conduit end fitting isolator over at least a portion of the sleeve, a conduit end fitting cap extending over (although not necessarily in contact with) at least a portion of the isolator, an abutment engaging the conduit end fitting cap and extending over (although not necessarily in contact with) at least a portion of the conduit end fitting isolator, a swivel tube extending from within the abutment and having a longitudinal bore into which the core wire extends toward the core wire length adjuster, and a shield or support cover over the swivel tube near the abutment. The conduit end fitting isolator comprises a polymeric silicone compound meeting ASTM D2000 M3GE508 Z2.

In certain exemplary embodiments the conduit end fitting isolator is a single piece of polymeric silicone compound meeting ASTM D2000 M3GE508 Z1 Z2. The cable assemblies according to certain exemplary embodiments of this aspect of the disclosure have the characteristic of being able to pass the Lash 100,000 Cycles Test (described further, below), and in some cases also one or a combination of the following additional high temperature performance tests (described further, below):

Attachment Pin Installation 100,000 Cycles Test,
Attachment Pin Extraction 100,000 Cycles Test,
Cable Efficiency Test, and
In-Vehicle Routing 165° C. Cable Strength Test.

Certain embodiments of the transmission shift cable assemblies have the characteristic of being able to pass one or a combination of the following tests (further described below):

Lash 200,000 Cycles Test,
Attachment Pin Installation 200,000 Cycles Test,
Attachment Pin Extraction 200,000 Cycles Test,
In-Vehicle Routing 165° C. Cable Strength Test, and
Cable Efficiency Test.

Those of ordinary skill in the art will recognize that various embodiments of the transmission shift cable assemblies and components disclosed here represent a significant technological advance and can provide significant advantages. For certain exemplary embodiments these advantages include their high temperature performance characteristics. Good design flexibility and performance can be achieved with the cable assemblies and components disclosed here. More generally, it will be recognized from this disclosure and the following description of certain exemplary embodiments that transmission shift cable assemblies and components can be achieved which meet the more stringent specifications recently issued for certain motor vehicle applications, have good performance, are economical to produce or have a combination of two or more of these advantages. Additional and optional features and advantages will be apparent from the following disclosure of certain preferred and exemplary embodiments. It will be recognized by those skilled in the art, given the benefit of this disclosure, that there are numerous alternative embodiments of the cable assemblies and components disclosed here. In that regard, it is to be understood that features or elements of any described or disclosed embodiment is meant to be combinable or substitutable with or for any and all other disclosed features and elements, and all such permutations and combinations of features and elements are within the scope of the invention disclosed and claimed.

BRIEF DESCRIPTION OF THE DRAWINGS

Certain preferred embodiments are described below with reference to the accompanying figures in which:

FIG. 13 is an enlarged elevation view of the isolator of the core wire length adjuster of the transmission shift cable assembly embodiment of FIG. 7, adapted to be cooperate with the cap retainer of FIG. 9 and the tapered pin of FIG. 12;

FIG. 14 is a section view through line A-A in FIG. 13;

FIG. 15 is an enlarged perspective view of the conduit isolator of the transmission end conduit end fitting of the cable assembly of FIG. 7;

FIG. 16 is an elevation view, in section, of the conduit isolator of FIG. 15.

Figure 1:
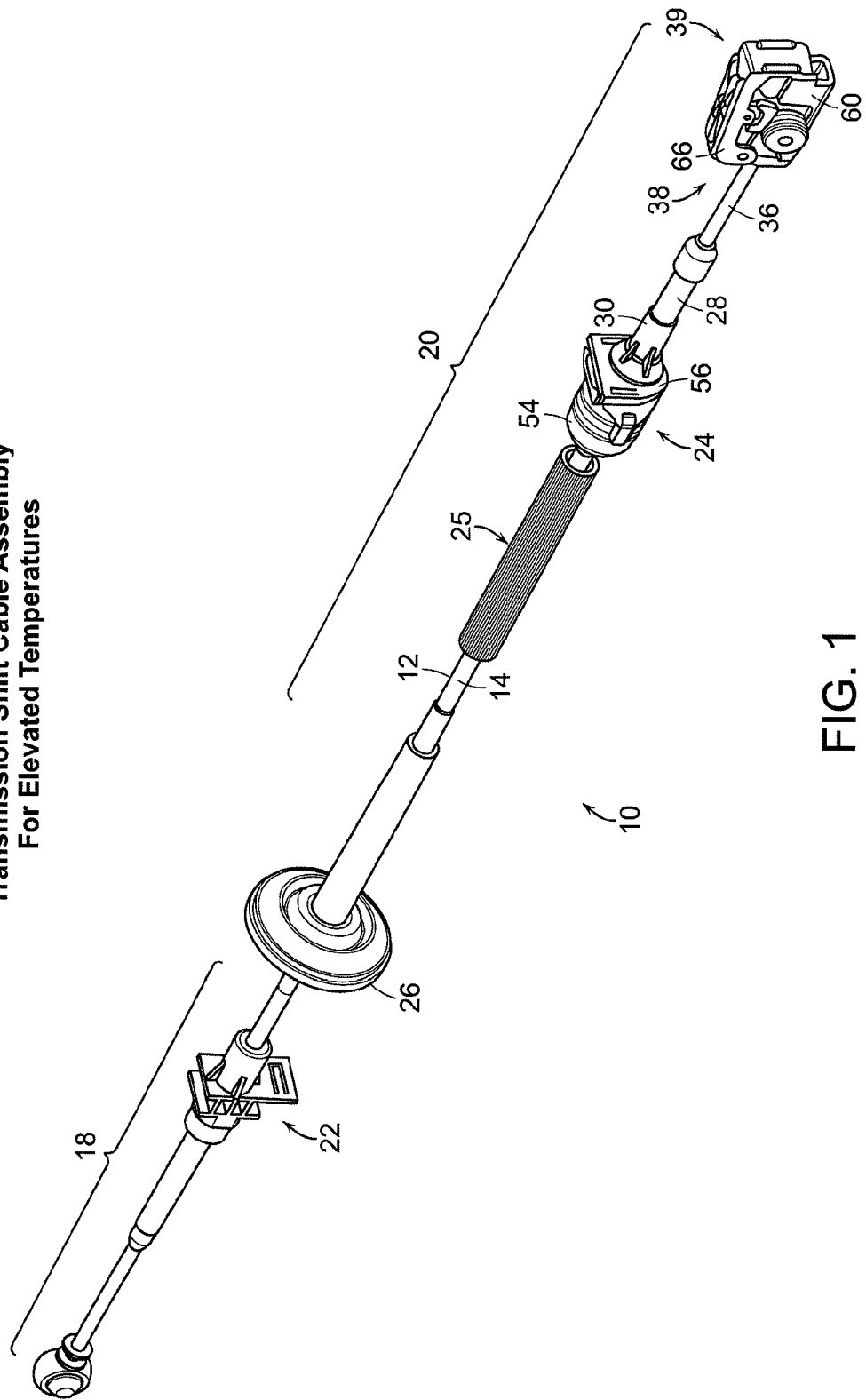
FIG. 1 is a perspective view of a transmission shift cable assembly in accordance with one of many possible alternative embodiments of the invention.
Figure 2:
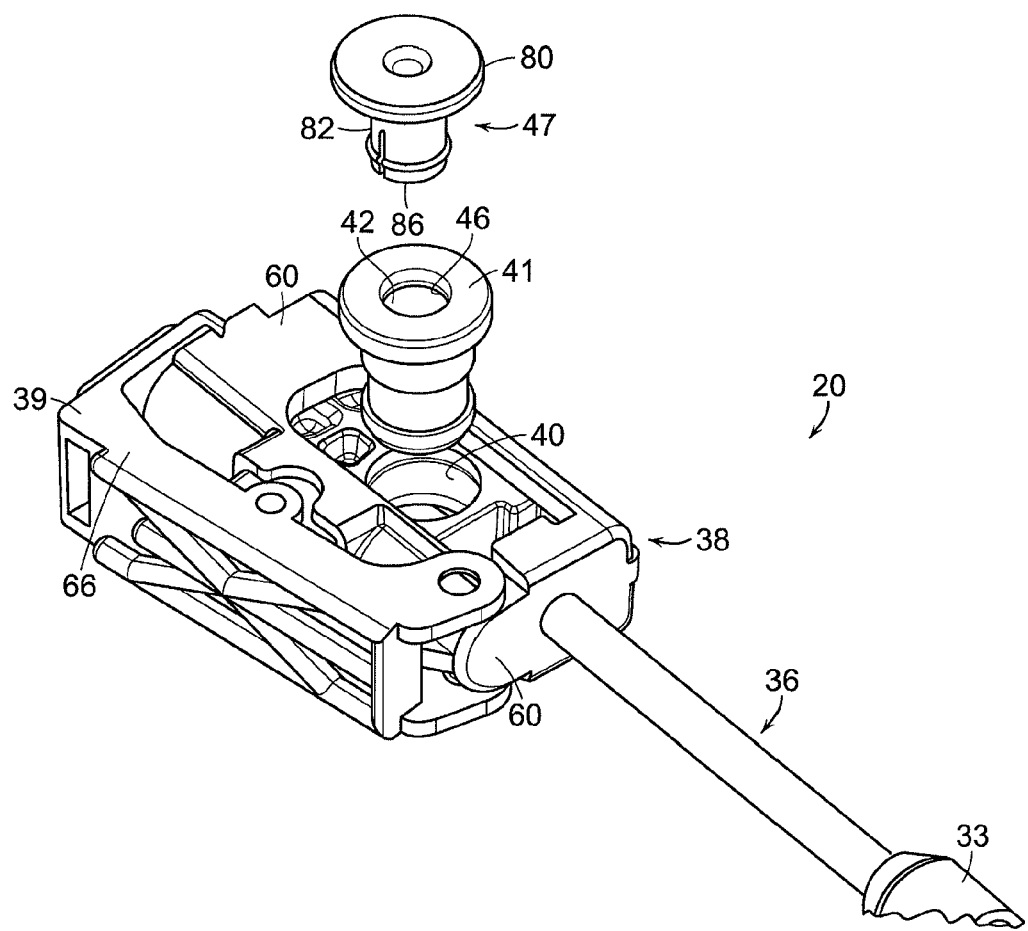
FIG. 2 is an enlarged, exploded, perspective view, partially broken away, of the core wire length adjuster at the transmission end of the cable assembly of FIG. 1.
Figure 3:
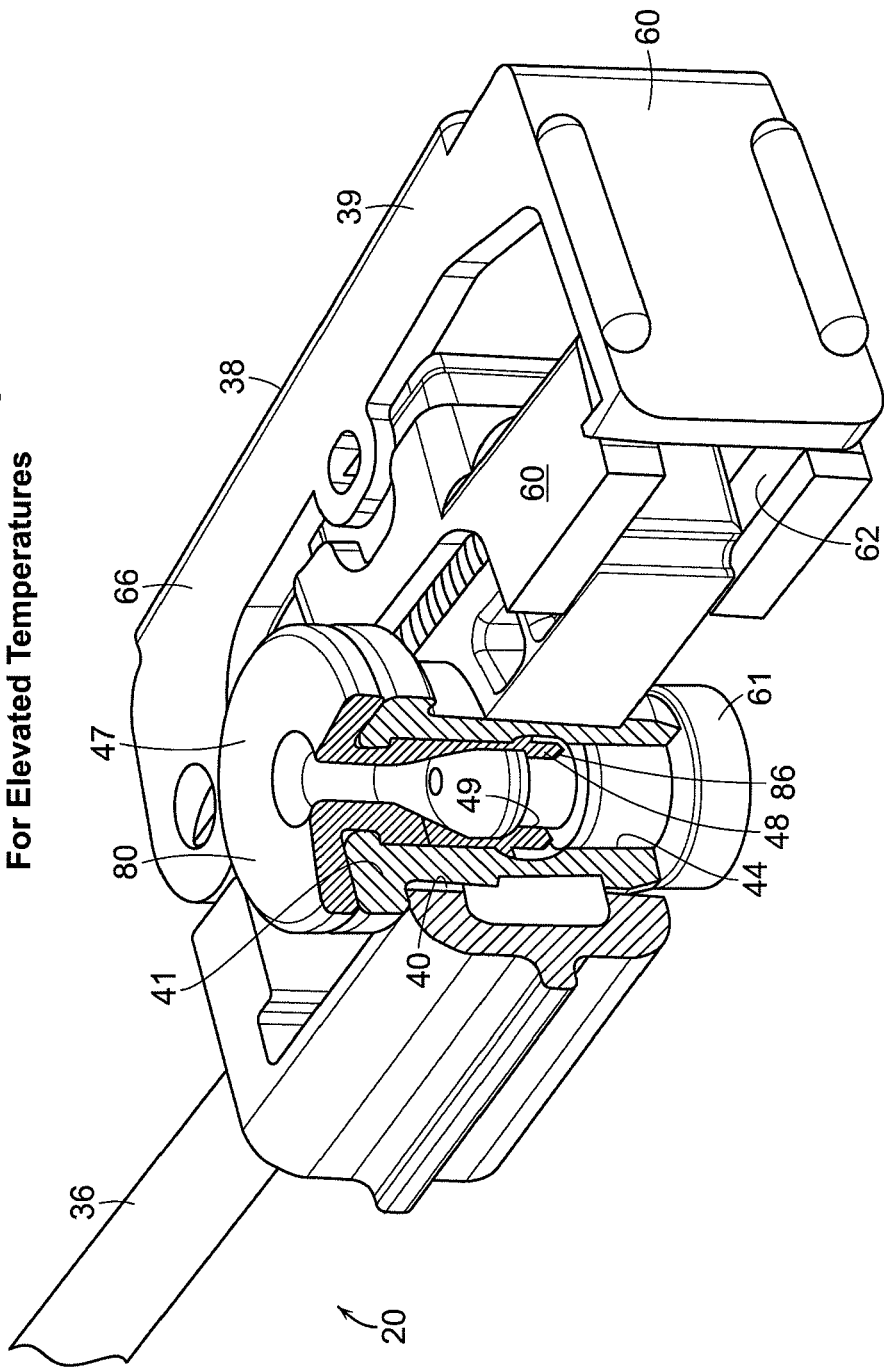
FIG. 3 is an enlarged perspective view, partially broken away and partially in section, of the core wire length adjuster of the cable assembly of FIG. 1.
Figure 4:
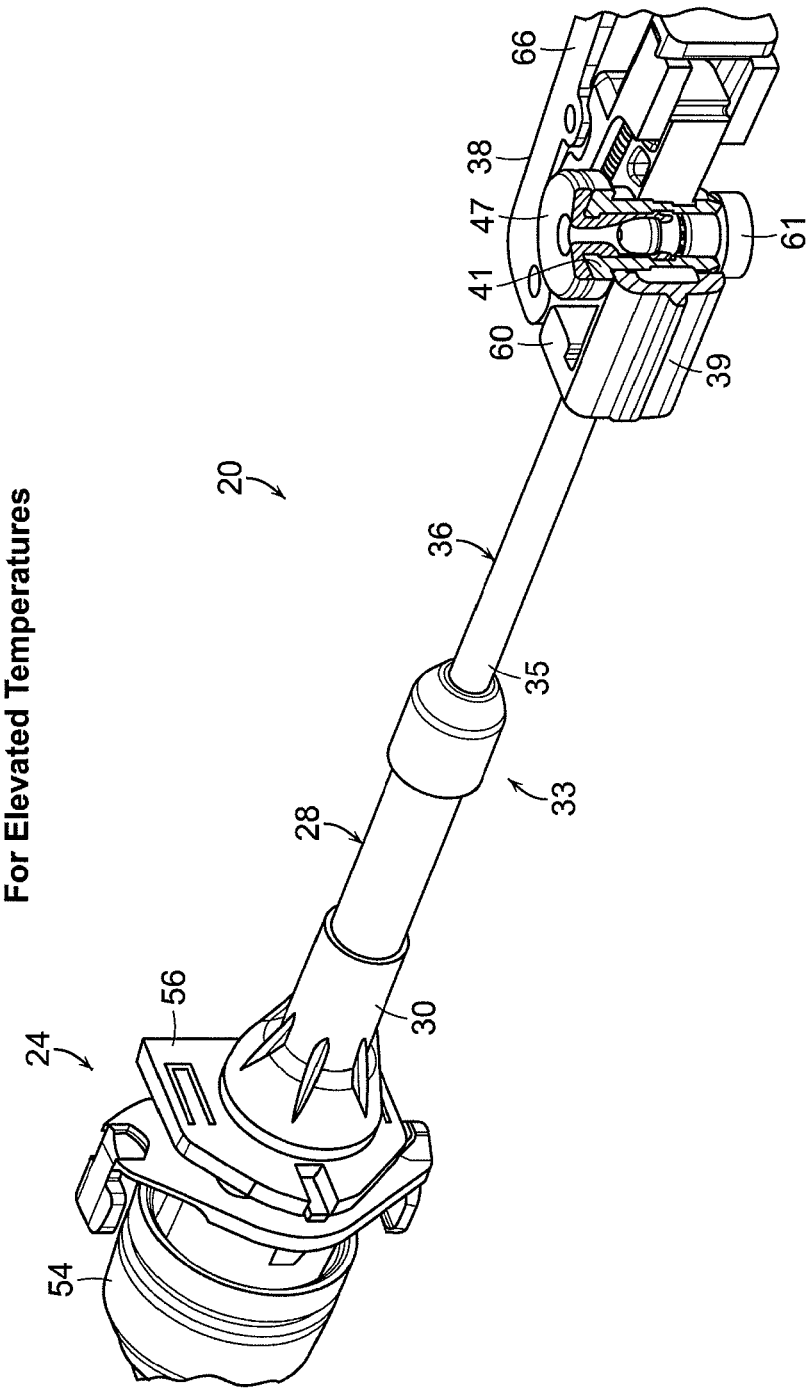
FIG. 4 is an enlarged perspective view, partially broken away and partially in section, of the core wire length adjuster and transmission end conduit end fitting of the cable assembly of FIG. 1, including the portion of the cable assembly between them.

It should be understood that the appended drawings are not necessarily to scale, presenting a somewhat simplified representation of various embodiments with critical or optional features illustrative of the basic principles of the invention. The specific design features of the remote-control cable assembly as disclosed herein, including, for example, specific dimensions, orientations, and shapes of the isolator and adapter ring will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the remote control cable assemblies illustrated in the drawings. In general, up or upward refers to an upward direction in the plane of the paper of the drawing in question, and down or downward refers to a downward direction in the plane of that paper.

DETAILED DESCRIPTION OF CERTAIN EXEMPLARY EMBODIMENTS

It will be apparent to those skilled in the art, that is, to those who have knowledge or experience in this area of technology, that many uses and design variations are possible for the improved motion-transmitting remote control cable assemblies disclosed herein. The following detailed discussion of various alternative and preferred embodiments will illustrate the general principles of the invention with reference to a remote control cable assembly for use with a motor vehicle transmission shifter system. In such embodiments of the cable assemblies disclosed here, adapted for use as a transmission shifter cable assembly, and in certain other embodiments, the shifter end is alternatively referred to as the input end, as it receives the operator's hand motion or the like to shift the transmission. Likewise, therefore, the shifter end portion is alternatively referred to as the input end portion. Correspondingly, the transmission end is alternatively referred to as the output end, as it delivers the shifting motion to the transmission. The transmission end portion, therefore, may be referred to as the output end portion. Other embodiments suitable for other applications will be apparent to those skilled in the art given the benefit of this disclosure. Also, to the extent suitable for the particular intended application of a given embodiment, various alternative or additional features and designs known to those skilled in the art can be incorporated into the transmission shift cable assemblies disclosed here, e.g., any of the design features disclosed in commonly assigned U.S. patent applications Ser. No. 10/159,755 entitled Reverse Clip Cap Terminal Connector, Ser. No. 10/828,385 entitled Terminal Connectors and Terminal Connector Assemblies, and Ser. No. 10/930,105 entitled Conduit End Fitting, the disclosures of all of which are hereby expressly incorporated herein in their entirety by reference, for all purposes.

As noted above, at least certain embodiments of the transmission shift cable assemblies provide an advantageous solution to new, stringent requirements for the transmission end portion of an automotive transmission shift cable assembly. Specifically, such embodiments are operative, i.e., suitable for use over extended periods at elevated temperatures, as set forth in those specifications. In accordance with such embodiments, high temperature cable assemblies have extended performance at high temperatures, including at least 165° C. In at least certain embodiments of the transmission shift cable assemblies, the transmission end portion passes one, multiple or all of the following tests.

Elevated Temperature Life Cycle Testing

Procedures: A transmission cable assembly for a motor vehicle is mounted in accordance with the intended vehicle routing, including all brackets and attaching hardware, using either an actual vehicle or simulating it with a suitable mounting buck or jig. Using the temperature schedule shown in Table A, the cable is put through 200,000 cycles through its maximum travel at a rate of 20+/−2 cycles per minute (CPM) under a maximum torque of 111N applied at the transmission lever end for each transmission detent position. One load cycle consists of a complete traverse of the shift cable pattern at the operator end, typically established by an installation layout. A 5% salt water solution is sprayed on the outside of the ends of the cable while freely cycling the cable core 5 times through its maximum travel prior to the beginning of each cycling schedule sequence shown in Table A.

TABLE A

Cycling Schedule and Temperature Ranges (PV)

| Number of Cycles | Accumulative Cycles | Outside of Vehicle Temperature | Inside of Vehicle Temperature |
|---|---|---|---|
| 35,000 | 35,000 | 65° C. | 23° C. |
| 10,000 | 45,000 | −40° C. | −40° C. |
| 15,000 | 60,000 | 165° C. | 82° C. |
| 40,000 | 100,000 | 65° C. | 23° C. |
| 100,000 | 200,000 | 23° C. | 23° C. |

Lash 100,000 Cycles Test

Figure 17:
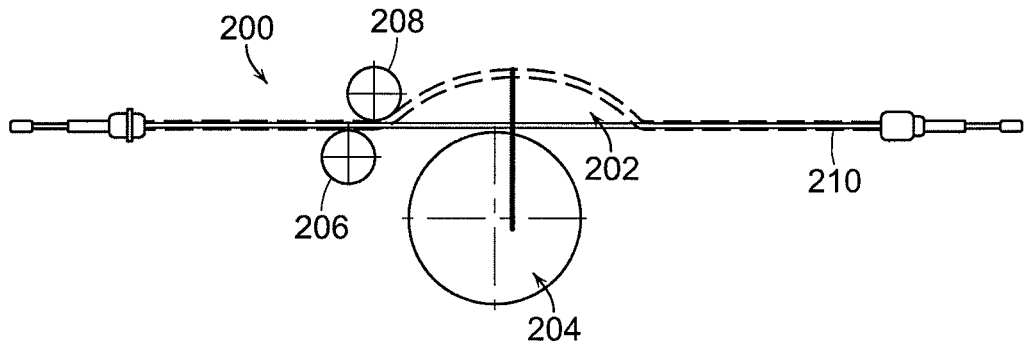
FIG. 17 is a schematic view of a cable assembly having a molded length less than 850 mm, mounted on a testing mandrel apparatus for performing a dynamic efficiency test ("Cable Efficiency Test") on the cable, as described further, below.
Figure 18:
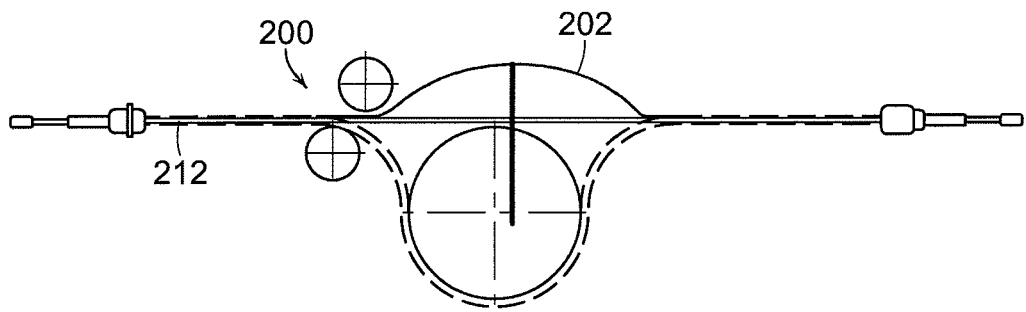
FIG. 18 is a schematic view of a cable assembly having a molded length greater than 850 mm and less than 1250 mm, mounted on a testing mandrel apparatus for performing a dynamic efficiency test on the cable, as described further, below.
Figure 19:
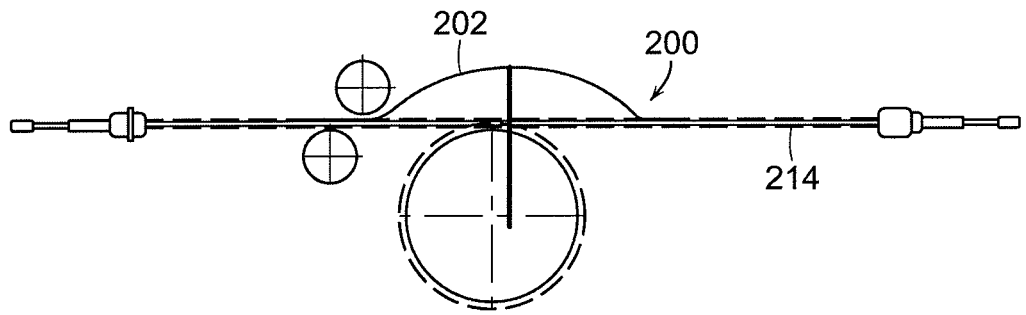
FIG. 19 is a schematic view of a cable assembly having a molded length greater than 1250 mm, mounted on a testing mandrel apparatus for performing a dynamic efficiency test on the cable, as described further, below.

When the cable assembly has completed 100,000 cycles (see Table A, above), it is mounted in a standard testing fixture simulating cable routing, e.g., as shown in FIGS. 17-19. FIG. 17 shows the arrangement for a cable assembly 210 having a molded length less than 850 mm. FIG. 18 shows the arrangement for a cable assembly 212 having a molded length greater than 850 mm and less than 1250 mm. FIG. 19 shows the arrangement for a cable assembly 214 having a molded length greater than 1250 mm. With the adjuster and conduit end fitting locked into place, a 17.8N compressive load is applied to the cable core, i.e., to the conduit subassembly core. A travel indicator is then zeroed. A tensile load of 17.8N is then applied to the core. The travel distance of the core is then recorded as lash or backlash. Under a load of 17.8N the total backlash of the cable assembly does not exceed:

1.3 mm for cables under 850 mm in molded conduit length;

2.0 mm for cables over 850 mm but less than 1200 mm of molded conduit length; or 2.5 mm for cables 1200 mm in length but less than 2400 mm of molded conduit length.

Attachment Pin Installation 100,000 Cycles Test

When the cable has completed 100,000 cycles, it is removed and the attachment pin (e.g., ball stud, tapered pin, etc.) installation force is measured. Specifically, a strain indicator is used to measure the force required to install the adjuster onto a maximum material condition attachment pin. The maximum force required to fully install the attachment pin into the adjuster is recorded. The requirement is a measured installation force of 130N maximum.

Attachment Pin Extraction 100,000 Cycles Test

After the cable has completed 100,000 cycles, it is removed and the force required to remove the adjuster from the attachment pin is measured. Specifically, a strain indicator is used to measure the maximum force required to remove a limited material condition attachment pin from the adjuster. The maximum force required to remove the attachment pin from the adjuster is recorded. The requirement is a measured extraction force of 82N minimum.

Cable Efficiency Test

The dynamic efficiency of the cable assembly is measured at three times during life cycle testing, specifically, before, during, and after life cycle testing. More specifically, testing as follows is performed at zero cycles, at 100,000 cycles, and at 200,000 cycles. The cable assembly is routed securely in a standard testing fixture simulating a generic cable routing. For example, a testing mandrel apparatus 200 as depicted in FIGS. 17-19 can be employed. Testing mandrel apparatus 200 comprises a test fixture 202, large mandrel 204 and smaller mandrels 206 and 208. FIG. 17 shows the arrangement for a cable assembly 210 having a molded length less than 850 mm. FIG. 18 shows the arrangement for a cable assembly 212 having a molded length greater than 850 mm and less than 1250 mm. FIG. 19 shows the arrangement for a cable assembly 214 having a molded length greater than 1250 mm. A tensile load of 111N is applied at the transmission end of the cable perpendicular to the transmission end fitting. The shifter end of the cable is pulled perpendicular to the shifter end fitting at a rate of 15 cycles per minute, and the input load is recorded. The efficiency value is calculated as (the output load value divided by the input load value)×100%. Passing he test requires that the cable be determined to maintain a minimum efficiency of 40% throughout the 200,000 life cycle test.

In-Vehicle Routing 165° C. Cable Strength Test

A new cable assembly is used for this test, and is soaked at 165° C. for one hour before testing. The cable is mounted in accordance with the intended vehicle layout, including all brackets and attaching hardware, using either an actual vehicle or simulating it with a suitable mounting buck or jig. The core is loaded with a tensile load of 667N five times, each time for a duration of ten seconds. A compressive load of 333.8N is applied to the core five times, each time for a duration of ten seconds. There shall be no measured permanent change in the length of either core or housing assembly.

Lash 200,000 Cycles Test

When the cable has completed 200,000 cycles, it is mounted in a standard testing fixture simulating generic cable routing. With the adjuster and conduit end fitting locked into place, a 17.8N compressive load is applied to the core. A travel indicator is then zeroed. A tensile load of 17.8N is then applied to the core. The travel distance of the core is then recorded as lash or backlash. Under a load of 17.8N the total backlash of the cable assembly does not exceed:

1.3 mm for cables under 850 mm in molded conduit length;

2.0 mm for cables over 850 mm but less than 1200 mm of molded conduit length; or 2.5 mm for cables 1200 mm in length but less than 2400 mm of molded conduit length.

Attachment Pin Installation 200,000 Cycles Test

When the cable has completed 200,000 cycles, it is removed and the attachment pin installation force is measured. Specifically, a strain indicator is used to measure the force required to install the adjuster onto a maximum material condition attachment pin. The maximum force required to fully install the attachment pin into the adjuster is recorded. The requirement is a measured installation force of 130N maximum.

Attachment Pin Extraction 200,000 Cycles Test

After the cable has completed 200,000 cycles, it is removed and the force required to remove the adjuster from the attachment pin is measured. Specifically, a strain indicator is used to measure the maximum force required to remove a limited material condition attachment pin from the adjuster. The maximum force required to remove the attachment pin from the adjuster is recorded. The requirement is a measured extraction force of 82N minimum.

Referring now to the drawings, FIGS. 1-6 show various features of one exemplary embodiment of a transmission shift cable assembly in accordance with this disclosure, for a motor vehicle, such as an automobile. While the illustrated embodiments of the present invention are particularly adapted for use with an automobile, it is noted that alternative embodiments may be adapted for use in other motor vehicles, including trucks, buses, vans, recreational vehicles, earth moving equipment and the like, off road vehicles such as dune buggies and the like, air borne vehicles, and water borne vehicles. While the illustrated embodiments of the present invention are particularly adapted for use as a transmission shift cable assembly, certain exemplary embodiments can be utilized in other motor vehicle applications, such as, for example, accelerator, or similar applications. The advantages of operability at elevated temperatures are achieved, e.g., where the transmission end is instead adapted to receive a connection pin associated with any such motor vehicle system located in the engine compartment or driveline tunnel of the vehicle. The following description of certain exemplary embodiments will focus primarily on transmission shift cable assemblies, and those of ordinary skill in the art will understand from such description the manner of applying the principles disclosed to such other motor vehicle uses.

As shown in FIGS. 1-6, the remote control cable assembly 10 includes conduit subassembly 12 comprising conduit end fittings and flexible conduit 14. The conduit typically comprises a liner formed of a suitable material, e.g. Teflon, and a flexible strand or core comprising one or multiple wires within the liner. In the illustrated embodiment, conduit 14 comprises flexible strand or core wire 16 extending longitudinally slidably within the conduit 14. The cable assembly has shifter end portion 18 and transmission end portion 20, each of which includes a conduit end fitting, specifically, conduit end fitting 22 of the shifter end portion 18 and conduit end fitting 24 of the transmission end portion 20. It will be understood by those having ordinary skill in the art, that the term "transmission end portion" and similar such terms, unless otherwise clear from context, refer to the portion of the transmission shift cable assembly which in typical usage is (or is intended to be) in the engine compartment or driveline tunnel of the motor vehicle. Correspondingly, the "shifter end portion" is the portion of the transmission shift cable assembly which in typical usage is (or is intended to be) located in the passenger compartment of the motor vehicle. Thus, with reference to the particular embodiment illustrated in FIG. 1, the transmission end portion may be taken as the portion of the cable assembly extending to the right of the firewall grommet 26. The transmission end portion in that embodiment includes, therefore, at least such components as the core wire length adjuster 38, the transmission end conduit end fitting 24, and the wear or heat sleeve 25. Correspondingly, the shifter end portion in the embodiment illustrated in FIG. 1 includes the portion of the cable assembly extending upward to the left of the firewall grommet 26, including at least such components as the conduit end fitting 22.

In the illustrated embodiment, the conduit end fittings are adapted or operative to mount the cable assembly in a vehicle. The cable assembly can be mounted in position in the vehicle by securing the conduit end fittings to suitable brackets or other rigid structure or the like (not shown). Numerous alternative or additional mounting features will be readily apparent from this disclosure to those of ordinary skill in the art, such as, for example, the conduit fitting designs disclosed in U.S. Pat. Nos. 5,862,710 and 5,884,531, the disclosures of which are hereby expressly incorporated herein in their entirety by reference for all purposes. The illustrated embodiment includes a grommet 26 at a location along the cable assembly suitable for mounting or being otherwise positioning at the firewall or other partition between the passenger compartment of the vehicle and the engine compartment or driveline tunnel. In many instances, the high temperature performance characteristics disclosed here will be required only of the transmission end portion 20 which in assembly is in the engine compartment or driveline tunnel where temperatures are routinely more extreme.

Figure 6A:
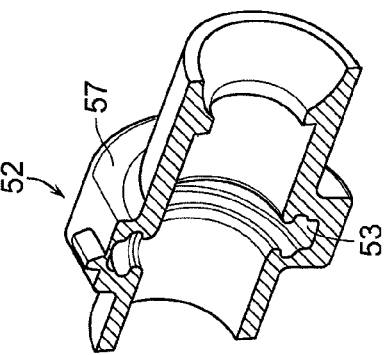
FIGS. 6 and 6A are enlarged perspective views, partially in section and partially broken away, of a portion of the cable assembly of FIG. 1, including the transmission end conduit end fitting and adjacent portions of the cable assembly.
Figure 6:
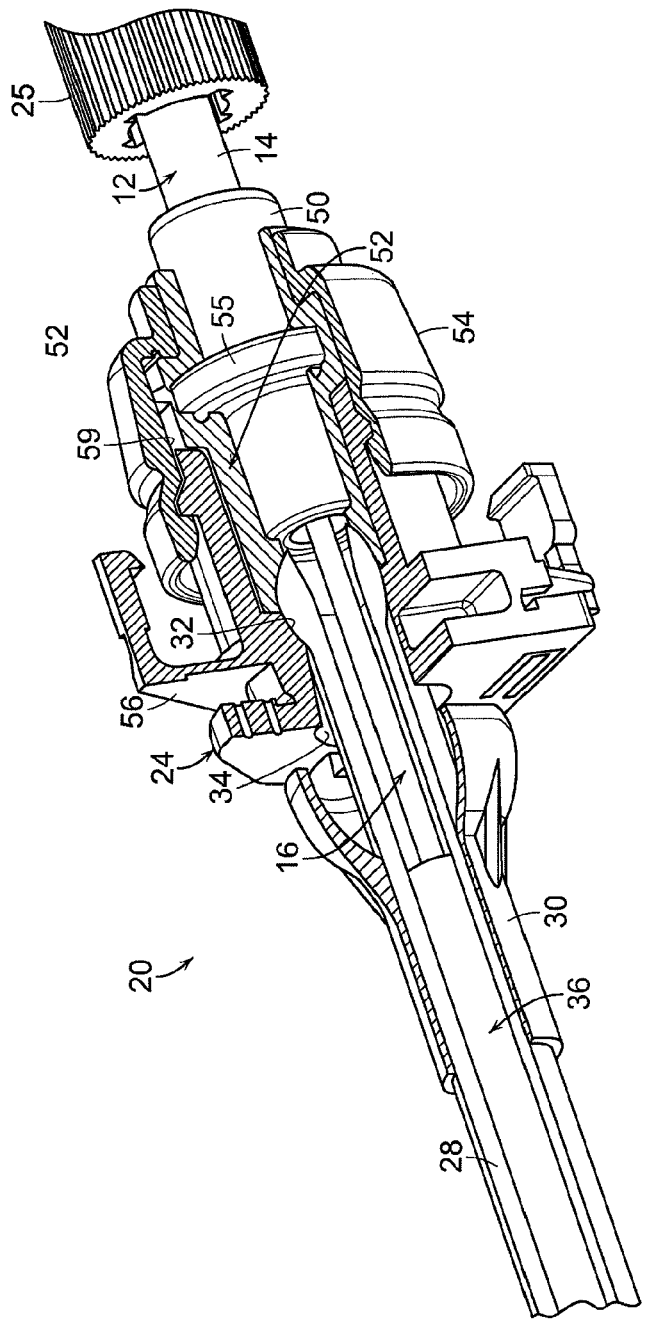
Figure 7:
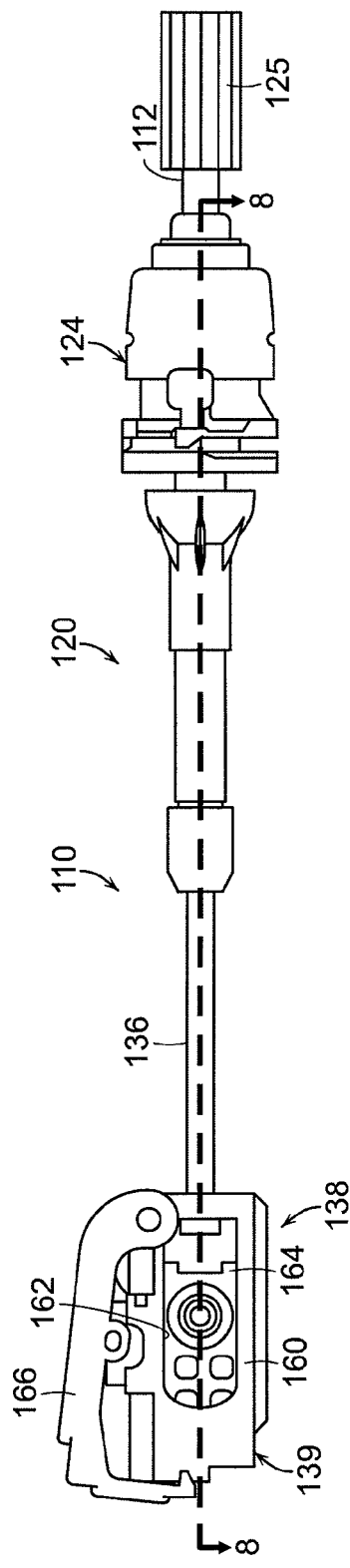
FIG. 7 is an elevation view, partially broken away, of an alternative embodiment, including the transmission end conduit end fitting, core wire length adjuster, and portions of the cable assembly between them and beyond the conduit end fitting.
Figure 8:
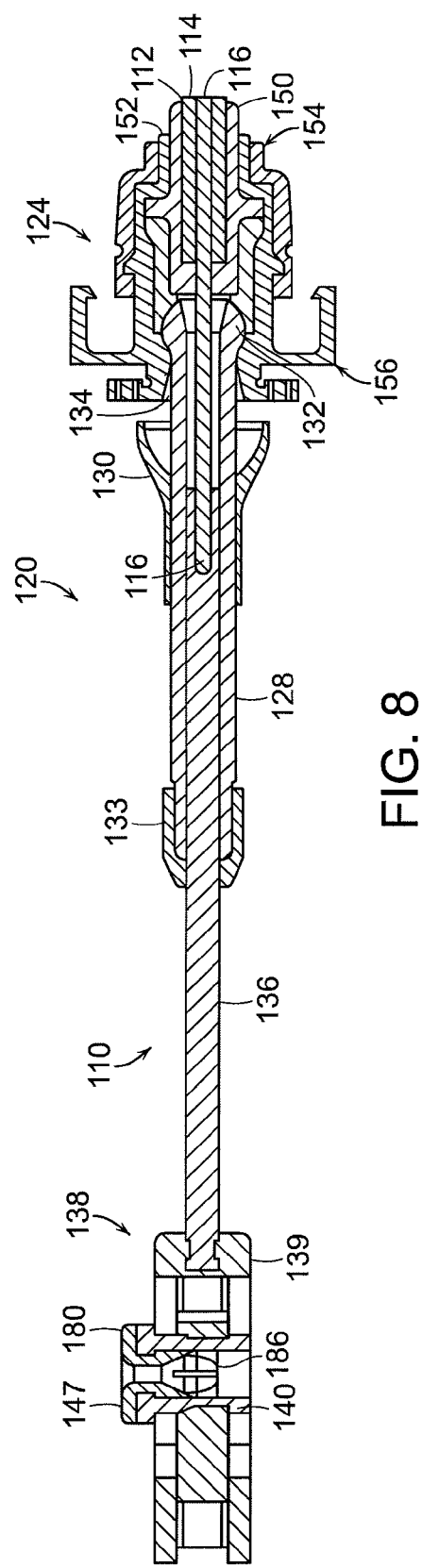
FIG. 8 is a section view through line A-A in FIG. 7.
Figure 9:
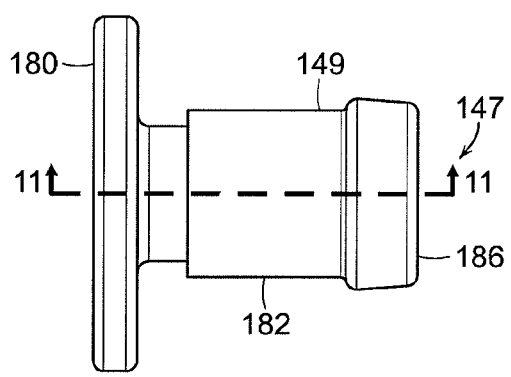
FIG. 9 is an enlarged elevation view of the cap retainer of the core wire length adjuster of the transmission shift cable assembly embodiment of FIG. 7, adapted to receive a tapered pin.

The conduit end fitting 24 includes a sleeve 50 secured in position over the exterior of that end of the conduit 14. A conduit end fitting isolator 52 is over at least a portion of the sleeve 50, and a conduit end fitting cap 54 is over at least a portion of the conduit end fitting isolator 52. An abutment 56 is over at least a portion of the conduit end fitting isolator 52 and engages the conduit end fitting cap 54. As best seen in FIG. 6A, the conduit end fitting isolator 52 of the illustrated embodiment has an interior groove 53 configured to receive a corresponding ridge 55 or other such configuration feature of the sleeve 50 and an exterior ridge 57 configured to be received in a circumferential slot 59 or the like formed cooperatively by the conduit end fitting cap 54 and conduit end fitting abutment 56. In this manner, the components of the conduit end fitting 24 cooperatively secure the position of the conduit end fitting 24 along the cable assembly. Numerous alternative embodiments will be apparent to those of ordinary skill in the art given the benefit of this disclosure. A swivel tube 28 and shield 30 has a swivel joint 32 in aperture 34 to allow for swiveling movement relative to other components of the conduit end fitting 24. The core wire 16 is connected to rod 36, e.g., a steel rod or other suitable rod, which extends to the core wire length adjuster 38 of the transmission end portion 20. The core wire can be secured to the rod 36 in any suitable manner, such as, for example, staking or crimping. The rod moves longitudinally back and forth within the swivel tube 28 to define a line of force as the cable assembly is actuated by an operator of the vehicle's shifter or the like.

Figure 5:
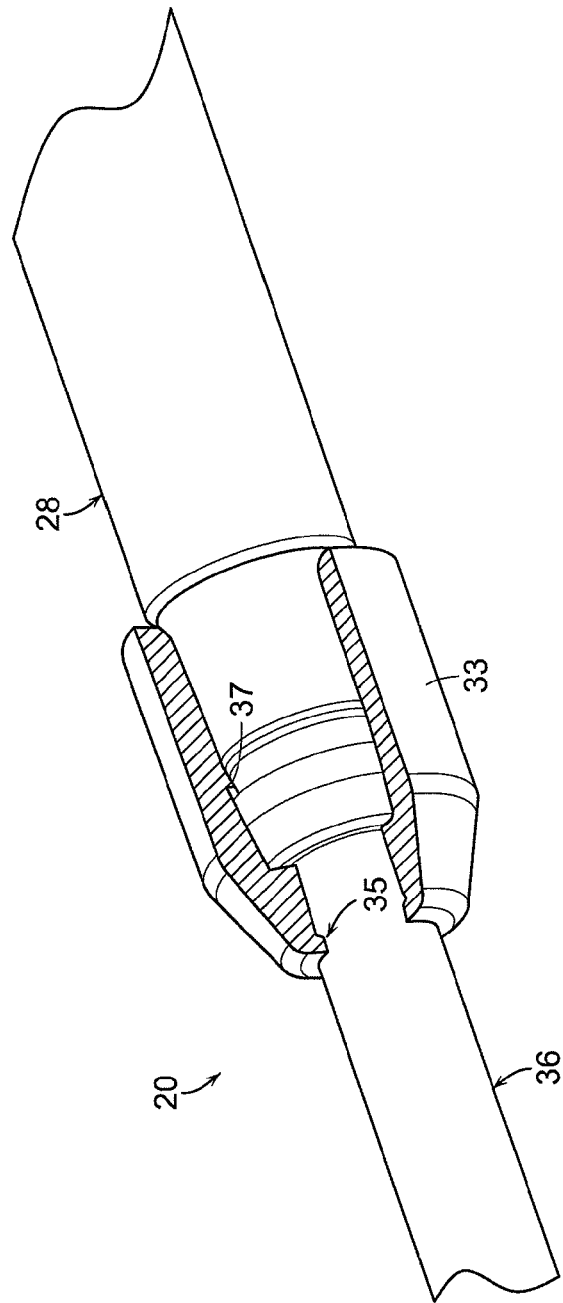
FIG. 5 is an enlarged perspective view, partially in section and partially broken away, showing the swivel tube and associated seal of the cable assembly of FIG. 1.

In the illustrated embodiment the conduit end fitting 24 also includes a wiper seal 33 at the end of the swivel tube 28. As best seen in FIG. 5, edge 35 of wiper seal 33 has close sliding contact with the outer surface of rod 36, such that wiper seal 33 can prevent dirt and the like from entering the swivel tube and potentially causing wear or binding between the rod 36 and the inside surface of the swivel tube in which rod 36 slides longitudinally. The inside surface of wiper seal 33 and outside surface of swivel tube 28 in the illustrated embodiment have corresponding configurations operative to secure the position of wiper seal 33 on the end of swivel tube 28. Numerous alternative configurations for wiper seal 33 will be apparent to those skilled in the art given the benefit of the disclosure. In certain exemplary embodiments the wiper seal 33 comprises thermoplastic elastomer which remains pliable and sealing up to a temperature of at least 165° C. Alternatively, for example, a boot or other such device can be used to seal the swivel tube against dirt and moisture. As further described below, the core wire length adjuster 38 is connected to a control component or member of the vehicle's transmission in the cabin, such as a shifter pin or transmission end pin, to shift the transmission setting. Numerous alternative configurations for the conduit end fitting 24 will be readily apparent to those of ordinary skill in the art given the benefit of this disclosure.

The conduit end fitting isolator 52 must be sufficiently soft and resilient to perform its isolator function, including absorbing or damping vibrations transmitted along the cable assembly. Further, the isolator must perform satisfactorily over an extended period of use in the harsh environment of the engine compartment or driveline tunnel. Now, under the above mentioned more stringent temperature performance requirements, the isolator must pass a battery of test correlating to satisfactory performance over an extended period of use at elevated temperatures cycling to at least 165° C. Accordingly, the conduit end fitting isolator of transmission shift cable assemblies disclosed here comprises, e.g., is entirely formed of, a suitable material such as thermoplastic elastomer (TPE), polymeric silicone compound, thermoplastic polyurethane elastomer (unspecified) (TPU), thermoplastic polyurethane elastomer (polyester) (TPU-polyester) and the like. In certain exemplary embodiments the conduit end fitting isolator is a polymeric silicone compound meeting ASTM D2000 M3GE508 Z2. It will be understood that such materials have tear strength of at least 10 kN/m, as indicated by the Z2 portion of the ASTM identifier. In certain exemplary embodiments the conduit end fitting isolator comprises a polymeric silicone compound meeting ASTM D2000 M3GE508 Z1 Z2. Such materials are colored black, as indicated by the Z1 portion of the ASTM identifier. Suitable such materials are commercially available. In certain exemplary embodiments the conduit end fitting isolator is a polymeric silicone compound meeting ASTM D2000 M3GE508 Z1 Z2 material such as Silastic 21216-V or Silastic 25150, each of which is available from Dow Corning Corporation, Midland, Mich. Other suitable materials will be apparent to one skilled in the art given the benefit of this disclosure.

The core wire length adjuster 38 has a main housing structure 39 which forms an isolator socket 40, a laterally extending isolator socket in the illustrated embodiment. Other isolator socket orientations and configurations can be used, as suitable for the intended application, and numerous such alternatives will be readily apparent to those of ordinary skill in the art given the benefit of this disclosure. In certain exemplary embodiments the housing 39 of core wire length adjuster 38 includes an outer body 60 defining a slideway 62; a slider 64 longitudinally slidably mounted in the slideway 62 and a lock 66 for releasably fixing the longitudinal position of the slider 64 in the slideway 62. As noted above, connector rod 36 extends from the core wire length adjuster 38 to the swivel tube 28 of the conduit end fitting 24. Adjustment of the position of the slider 64 in the slideway 62 and engagement of lock 66 adjusts the effective length of the core wire of the cable assembly. In this way, any build tolerances (e.g., the stacking up or accumulation of design tolerances allowed for each of the multiple components in the assembly or subassembly) and the like in the length of the core wire can be removed during initial assembly or maintenance of the cable assembly.

A generally annular or cylindrical core wire adjuster isolator 41 is configured to be received substantially concentrically in the isolator socket 40. The core wire adjuster isolator 41 has a generally central bore 42 forming a connector pin socket portion 44 adapted to receive connector pin 61 from the transmission, and a retainer cap socket portion 46. A retainer cap 47 is configured to be partially received in the retainer cap socket portion 46 of the isolator 41. In the illustrated embodiment the retainer cap is seen to be received substantially concentrically by the isolator and to have a head portion 80 and a generally cylindrical plug portion 82. The plug portion 82 extends axially from the head portion 80 to a free end 86 and forms a connector pin end socket 48 extending coaxially within the plug portion from the free end toward the head portion. The head portion is radially larger than the plug portion. In certain exemplary embodiments the retainer cap as just described is formed as a single piece. The connector pin end socket 48 is adapted to receive and engage a portion of the connector pin, i.e., the tip end of the pin in the illustrated embodiment. In the illustrated embodiment the connector pin end socket 48 of the retainer cap 47 has a deflectable wall or ridge or the like 49 configured to secure the connector pin 61. Suitable configurations include, for example, beads, ridges, indentations etc. and optionally establish a snap fit connection or engagement.

In use, when the a connector pin is inserted into the connector pin socket portion of the retainer cap in such embodiments, it pushes the deflectable wall of the retainer cap outward against the isolator to engaging the ridge or other such configuration and interlocking the retainer cap and isolator. The connector pin is engaged by the configuration for securing the connector pin, thereby increasing the extraction load for the connector pin. Other embodiments will be apparent to one skilled in the art given the benefit of this disclosure. In certain embodiments of the transmission shift cable assemblies disclosed here, the connector pin end socket of the retainer cap is formed to receive and engage a ball stud type attachment pin (alternatively referred to as a connector pin). The embodiment illustrated in FIGS. 1-6 is adapted for ball stud connector pin 61, which could typically be connected, for example, to a transmission lever. In other embodiments the connector pin end socket of the retainer cap is formed to receive and engage a tapered pin type connector pin. The embodiment illustrated in FIGS. 7-16 is adapted for tapered connector pin 161 having a tapered tip 163. Other embodiments will be apparent to one skilled in the art given the benefit of this disclosure. In assembly, in the illustrated embodiment, the isolator, connector pin and retainer cap are substantially coaxial with each other, and releasably or non-releasably interlock with each other. Numerous alternative configurations will be readily apparent to those of ordinary skill in the art given the benefit of this disclosure.

Referring now further to FIGS. 7-16, an alternative embodiment is illustrated of the cable assemblies disclosed here. Specifically, remote control cable assembly 110 includes conduit subassembly 112 having a flexible outer sheath or conduit 114 and a flexible strand or core wire 116 longitudinally slidable within the conduit 114. The cable assembly has shifter end portion (not shown) and transmission end portion 120, each of which includes a conduit end fitting. Transmission end portion 120 has conduit end fitting 124. The transmission end portion also includes core wire length adjuster 138 and wear or heat sleeve 125. Transmission shift cable assembly 110 of FIGS. 7-16 and, more specifically, transmission end portion 120 operate substantially in the same manner as transmission shift cable assembly 10 of FIGS. 1-6 and transmission end portion 20, respectively. The conduit end fitting 124 includes a sleeve 150 secured in position over the exterior of that end of the conduit 114. A conduit end fitting isolator 152 is over at least a portion of the sleeve 150, and a conduit end fitting cap 154 is over at least a portion of the conduit end fitting isolator 152. A conduit end fitting abutment 156 is over at least a portion of the conduit end fitting isolator 152 and engages cap 154. Swivel tube 128 and shield 130 has a swivel joint 132 in aperture 134 to allow for swiveling movement relative to other components of the conduit end fitting 124. The core wire 116 is connected to rod 136 which extends to the core wire length adjuster 138 of the transmission end portion 120. Conduit end fitting 124 includes wiper seal 133 at the end of swivel tube 128. In certain exemplary embodiments the wiper seal 133 comprises thermoplastic elastomer which remains pliable and sealing up to a temperature of at least 165° C.

The conduit end fitting isolator 152 comprises a polymeric silicone compound meeting ASTM D2000 M3GE508 Z2, with tear strength of at least 10 kN/m. In certain exemplary embodiments the conduit end fitting isolator comprises, e.g., is entirely formed of, a suitable material such as thermoplastic elastomer (TPE), polymeric silicone compound, thermoplastic polyurethane elastomer (unspecified) (TPU), thermoplastic polyurethane elastomer (polyester) (TPU-polyester) and the like. In certain exemplary embodiments the conduit end fitting isolator is a polymeric silicone compound meeting ASTM D2000 M3GE508 Z2. In certain exemplary embodiments it comprises a polymeric silicone compound meeting ASTM D2000 M3GE508 Z1 Z2. As noted above, suitable such materials are commercially available and their use here will be readily apparent to those skilled in the art even the benefit of the disclosure. As best seen in FIGS. 15 and 16, isolator 152 is formed as a single piece with living hinge 153 connecting portions 155 and 157 of the isolator 152.

The core wire length adjuster 138 has a main housing structure 139 which forms an isolator socket 140. Housing 139 of core wire length adjuster 138 includes an outer body 160 defining a slideway 162; a slider 164 longitudinally slidably mounted in the slideway 162 and a lock 166 for releasably fixing the longitudinal position of the slider 164 in the slideway 162. Connector rod 136 extends from the core wire length adjuster 138 to the swivel tube 128 of the conduit end fitting 124. Adjustment of the position of the slider 164 in the slideway 162 and engagement of lock 166 adjusts the effective length of the core wire of the cable assembly. In this way, any build tolerances in the length of the core wire can be removed during initial assembly or maintenance of the cable.

Figure 10:
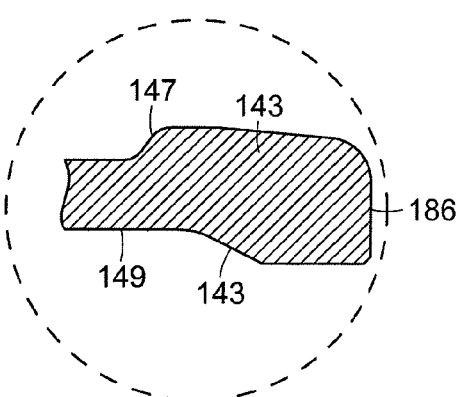
FIG. 10 is an enlarged view of section B in FIG. 11.
Figure 11:
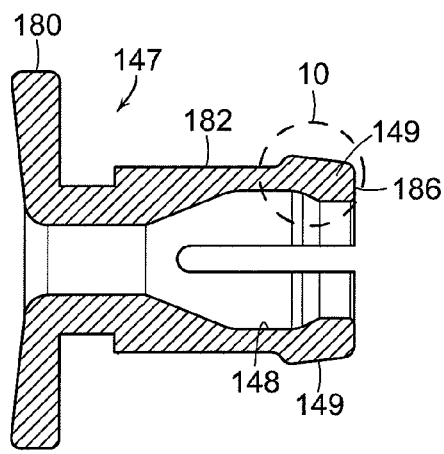
FIG. 11 is a section view through line A-A in FIG. 9.
Figure 12:
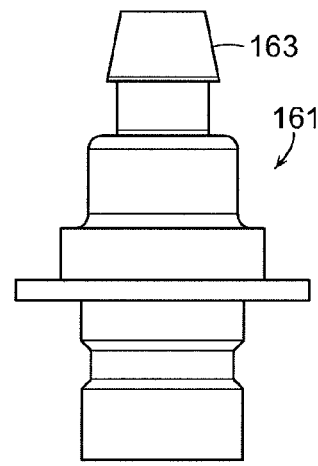
FIG. 12 is an enlarged elevation view of the tapered pin of the core wire length adjuster of the transmission shift cable assembly embodiment of FIG. 7, adapted to be received by the cap retainer of FIG. 7 and associated isolator.

A generally annular or cylindrical core wire adjuster isolator 141 is configured to be received substantially concentrically in the isolator socket 140. The core wire adjuster isolator 141 has a generally central bore 142 forming a connector pin socket portion 144 adapted to receive connector pin 161 from the transmission, and a retainer cap socket portion 146. A retainer cap 147 is configured to be partially received in the retainer cap socket portion 146 of the isolator 141. In the illustrated embodiment the retainer cap is seen to be received substantially concentrically by the isolator and to have a head portion 180 and a generally cylindrical plug portion 182. The plug portion 182 extends axially from the head portion 180 to a free end 186 and forms a connector pin end socket 148 extending coaxially within the plug portion from the free end toward the head portion. The retainer cap is formed as a single piece. The connector pin end socket 148 is adapted to receive and engage a portion of the connector pin, i.e., the tip end of the pin in the illustrated embodiment. In the illustrated embodiment the connector pin end socket 148 of the retainer cap 147 has a deflectable wall or ridge or the like 149 with configuration 143 to secure the connector pin 161. Configuration 143 is best seen in FIG. 10, which is an enlarged view of section B in FIG. 11. Numerous suitable alternative configurations will be readily apparent to those skilled in the art given the benefit of the disclosure.

Core wire length adjuster 138 is adapted to be mounted to a tapered connector pin 161. Thus, the connector pin end socket 148 of plug portion 182 of retainer cap 147 is configured to receive and engage tapered end 163 of connector pin 161.

The core wire adjuster isolator or core adjuster isolator must have an appropriate durometer and be sufficiently resilient to perform its isolator function, including absorbing or damping vibrations otherwise transmitted along the cable assembly. Further, the isolator must perform satisfactorily over an extended period of use in the harsh environment of the engine compartment or driveline tunnel. Under the above mentioned more stringent temperature performance requirements, the isolator must pass a battery of tests correlating to performance stability, i.e., satisfactory performance over an extended period of use at elevated temperatures cycling to at least 165° C. Accordingly, the core wire adjuster isolator of transmission shift cable assemblies disclosed here comprises, optionally being formed entirely of, suitable material such as silicone, thermoplastic elastomer (TPE), thermoplastic polyester elastomer (TPEE), polyester-type thermoplastic polyurethane compound and the like. In certain exemplary embodiments the core wire adjuster isolator is a suitable material having a Shore Hardness of 62D±3 measured by test method ASTM D-2240. In certain exemplary embodiments the core wire adjuster isolator is a suitable polyester-type thermoplastic polyurethane compound. In certain exemplary embodiments such polyester-type thermoplastic polyurethane compound has a Shore Hardness of 62D±3 measured by test method ASTM D-2240 and has the additional nominal characteristics listed in Table B, below. As used here, the term "nominal characteristics" refers to numerical values, test properties, etc. for a set of characteristics or the like which are typical of or approximate to the actual values which would be found for various different production runs, batches or samples of the material. Thus, those of ordinary skill in the art will recognize that nominal characteristics may be used to specify a material, where the numerical values for some or all of the characteristics of any actual batch or sample of the specified material will vary slightly.

TABLE B

| Property | Test Method | Value |
| --- | --- | --- |
| Tensile Strength | ASTM D-412 | 37.9 MPa |
| Tensile Modulus | ASTM D-412 | |
| @ 100% Elongation | | 17.2 MPa |
| @ 300% Elongation | | 27.6 MPa |
| Ultimate Elongation | ASTM D-412 | 470% |
| Flexural Modulus @ 23° C. | ASTM D-790 | 275.9 MPa |
| Tear Strength | ASTM D-624, Die C | 178.3 kN/m |

In certain exemplary embodiments such polyester-type thermoplastic polyurethane compound or other suitable material mentioned above has a Shore Hardness of 62D±3 measured by test method ASTM D-2240 and has the additional nominal characteristics listed in Table C, below:

TABLE C

| Property | Test Method | Value |
| --- | --- | --- |
| Tensile Strength | ASTM D-412 | 37.9 MPa |
| Tensile Modulus | ASTM D-412 | |
| @ 100% Elongation | | 17.2 MPa |
| @ 300% Elongation | | 27.6 MPa |
| Ultimate Elongation | ASTM D-412 | 470% |
| Flexural Modulus @ 23° C. | ASTM D-790 | 275.9 MPa |
| Tear Strength | ASTM D-624, Die C | 178.3 kN/m |
| Glass Transition Temperature | Differential Scanning Calorimeter | −37° C. |
| Vicat Softening Point | ASTM D-1525 | 152° C. |

In certain exemplary embodiments such polyester-type thermoplastic polyurethane compound or other suitable material mentioned above has a Shore Hardness of 62D±3 measured by test method ASTM D-2240 and has the additional nominal characteristics listed in Table D below:

TABLE D

| Property | Test Method | Value |
|---|---|---|
| Specific Gravity | ASTM D-792 | 1.23 |
| Tensile Strength | ASTM D-412 | 37.9 MPa |
| Tensile Modulus | ASTM D-412 | |
| @ 100% Elongation | | 17.2 MPa |
| @ 300% Elongation | | 27.6 MPa |
| Ultimate Elongation | ASTM D-412 | 470% |
| Flexural Modulus @ 23° C. | ASTM D-790 | 275.9 MPa |
| Tear Strength | ASTM D-624, Die C | 178.3 kN/m |
| Taber Abrasion | ASTM D-3389 B | |
| CS-17 wheel, 1 kg load, | | 14.7 mg |
| 1,000 cycles | | 14.7 mg |
| Glass Transition Temperature | Differential Scanning Calorimeter | −37° C. |
| Vicat Softening Point | ASTM D-1525 | 152° C. |

Suitable such materials are commercially available. In certain exemplary embodiments the material is a suitable ESTANE® material, e.g., ESTANE® 58142, which is available from Noveon, Inc. (Cleveland, Ohio) or Elastollan C59D53, which is available from BASF Corporation Florham Park, N. J. Other embodiments will be apparent to one skilled in the art given the benefit of this disclosure.

The retainer caps of the core wire length adjuster can be designed for ease of assembly and to be capable of engaging the connector or terminal pin in conjunction with the core wire adjuster isolator and the core wire adjuster housing. Further, the retainer cap can be designed to perform satisfactorily over an extended period of use in the harsh environment of the engine compartment or driveline tunnel. In certain exemplary embodiments of the cable assemblies disclosed here, meeting the above mentioned more stringent temperature performance requirements, the retainer caps do not cause the cable assembly to fail the aforesaid battery of tests correlating to satisfactory performance over an extended period of use at elevated temperatures cycling to at least 165° C. Accordingly, the conduit end fitting retainer caps of at least certain exemplary embodiments of the transmission shift cable assemblies disclosed here comprises suitable material having certain physical properties and performance characteristics. Suitable materials for the retainer caps include, for example, polyether imide thermoplastic (PEI), Nylon 6 thermoplastic (polyamide 6), Nylon 66 thermoplastic (polyamide 66) (alternative versions) and the like, e.g., glass-filled Nylon 6/6, or a combination of any of them, meeting such physical properties and performance characteristics. In certain exemplary embodiments the high temperature retainer cap is formed of 25%-50% glass-filled Nylon 6/6. In certain exemplary embodiments the retainer cap is formed of 30%-35% glass-filled Nylon 6/6. In certain exemplary embodiments the retainer cap is formed of 25%-50% glass-filled Nylon 6/6, such as 30%-35%, e.g., 33% glass-filled Nylon 6/6.

Exemplary materials for the retainer cap, suitable for use in at least certain embodiments of the cable assemblies disclosed here, meet the characteristics listed in Table E, below. NOTE: Values in Table E are for Dry-As-Molded (DAM) resin properties.

TABLE E

| PROPERTY | TEST METHOD | UNITS | DATA |
|---|---|---|---|
| Tensile Strength | ASTM D638 | Psi | 25,000 |
| Tensile Elongation at Break | ASTM D638 | % | 3.0 |
| Flexural Modulus | ASTM D790 | Psi | 1,250,000 |
| Federal Motor Veh. Standard Specification - 302 | | | PASS |

Exemplary materials for the retainer cap, suitable for use in at least certain embodiments of the cable assemblies disclosed here, meet the characteristics listed in Table E, above and also meet the additional characteristics listed in Table F, below. NOTE: Values in Table F are for Dry-As-Molded (DAM) resin properties.

TABLE F

| PROPERTY | TEST METHOD | UNITS | DATA |
|---|---|---|---|
| Notched Izod Impact @ 23 C. | ASTM D256 | ft.lbs/in | 2.0 |
| Notched Izod Impact @ −40 C. | ASTM D256 | ft.lbs/in | 2.2 |
| Heat Deflection Temperature (264 psi) | ASTM D648 | ° F. | 475 |
| Heat Deflection Temperature (66 psi) | ASTM D648 | ° F. | 260° C. |
| Melting Point | ASTM D789 | ° F. | 495 |

Exemplary materials for the retainer cap, suitable for use in at least certain embodiments of the cable assemblies disclosed here, meet the characteristics listed in Tables E and F, above and also meet the additional characteristics listed in Table G, below. NOTE: Values in Table G are for Dry-As-Molded (DAM) resin properties.

TABLE G

| PROPERTY | TEST METHOD | UNITS | DATA |
|---|---|---|---|
| Specific Gravity | ASTM D792 | — | 1.38 |
| Linear Mold Shrinkage(1) | ASTM D955 | % | 0.15–0.4 |
| Hardness Rockwell | ASTM D785 | — | 98 M |
| Water Absorption @ 24 hrs | ASTM D570 | % | 0.9 |
| Tensile Elongation at Yield | ASTM D638 | % | 3.0 |
| Flexural Strength | ASTM D790 | psi | 40,000 |
| Coefficient Linear Thermal Expansion | ASTM D696 | 10−5/K | 5.1 |
| Flammability (thickness) | UL 94 | — | HB(2) (0.0295) |

EXAMPLES

Numerous alternative cable assemblies were tested and failed before the currently disclosed cable assemblies were developed. Along with considering manufacturability, cost feasibility, extended durability, robustness of design and other traditional design concerns and requirements for transmission cable assemblies, the alternative cable assemblies were subjected to a battery of performance testing including the important new high temperature performance characteristics for 165° C. discussed above. Certain such high temperature testing results are shown in the following table for seven different attempts. Each row in the following table shows the results of subjecting a different one of the design attempts to high temperature performance testing, including the high temperature performance tests described above: Lash 100,000 Cycles Test, Attachment Pin Installation 100,000 Cycles Test, Attachment Pin Extraction 100,000 Cycles Test, Lash 200,000 Cycles Test, In-Vehicle Routing 165° C. Cable Strength Test (referred to as Strength IV Routing 165° C. Test), Attachment Pin Installation 200,000 Cycles Test, and Attachment Pin Extraction 200,000 Cycles Test. As indicated by the column headings, some of the design attempts employed a ball stud connector pin and others employed a tapered pin design. In general, each is suitable for various embodiments of the cable assemblies disclosed here. The high temperature performance test results for a transmission shift cable assembly embodiment in accordance with the present disclosure are shown in the last row of the table below.

Those test results show that the high temperature embodiment in accordance with this disclosure passes each of the high temperature performance tests. In this regard, the high temperature embodiment test results shown in the last row have a passing average value of 96.8N, well below the test limit of 130N max. The maximum reading was 132.7N, slightly above the 130N limit, and the design was subsequently brought into compliance by routine minor adjustment of dimensional tolerances. In contrast, each other row in the table shows the high temperature performance test results for an alternative transmission shift cable assembly design not in accordance with this disclosure. As can be seen from their test results, every one of these other design attempts at high temperature cable assemblies failed. None of them pass each of the high temperature performance tests. It can be understood from these test results that high temperature transmission cable assembly embodiments in accordance with this disclosure can successfully overcome a difficult challenge in meeting stringent new high temperature performance requirements.

| | | | Lash 0 Cycles Requirement 2.0 mm Max | | Lash 100k Cycles Requirement 2.0 mm Max | | Ball Stud Installation 100K Requirement 130 N Max | |
|---|---|---|---|---|---|---|---|---|
| | Adjuster | | | | | | | |
| | Cap Retainer | Isolator | 6 mm Ball Stud | Tapered Pin | 6 mm Ball Stud | Tapered Pin | 6 mm Ball Stud | Tapered Pin |
| 165° C. Life Cycle | Part A Material 3 | Part B Material 2 | 6 Samples Avg = 0.94 mm Max = 1.16 mm Min = 0.84 mm | | 6 Samples Avg = 1.71 mm Max = 2.06 mm Min = 1.23 mm | | 6 Samples Avg = 69.4 N Max = 83.5 N Min = 52.0 N | |
| | Part D Material 2 | Part A Material 1 | | 8 Samples Avg = 1.00 mm Max = 1.18 mm Min = 0.74 mm | | 4 Samples Broke Retention Cap | | 4 Samples Broke Retention Cap |
| | Part A Material 3 | Part B Material 2 | | 3 Samples Avg = 0.97 mm Max = 0.99 mm Min = 0.95 mm | | 3 Samples Avg = 1.90 mm Max = 2.08 mm Min = 1.63 mm | | 3 Samples Avg = 31.0 N Max = 35.0 N Min = 28.6 N |
| | Part E Material 3 | Part C Material 3 | | 8 Samples Avg = 1.01 mm Max = 1.18 mm Min = 0.94 mm | | 4 Samples Avg = 1.79 mm Max = 2.10 mm Min = 1.55 mm | | 4 Samples Avg = 26.0 N Max = 34.0 N Min = 20.0 N |
| | Part E Material 3 | Part D Material 4 | | 8 Samples Avg = 0.99 mm Max = 1.09 mm Min = 0.89 mm | | 4 Samples Avg = 1.63 mm Max = 1.83 mm Min = 1.23 mm | | 4 Samples Avg = 41.0 N Max = 62.0 N Min = 29.0 N |
| | Part F Material 8 | Part D Material 4 | | 8 Samples Avg = 0.94 mm Max = 1.10 mm Min = 0.84 mm | | 4 Samples Avg = 1.62 mm Max = 1.71 mm Min = 1.52 mm | | 4 Samples Avg = 50.1 N Max = 64.7 N Min = 39.1 N |
| | Part G Material 8 | Part D Material 4 | | 8 Samples Avg = 1.12 mm Max = 1.20 mm Min = 1.04 mm | | 8 Samples Avg = 1.58 mm Max = 1.66 mm Min = 1.43 mm | | 8 Samples Avg = 96.8 N Max = 132.7 N Min = 78.6 N |

| | | | Ball Stud Extraction 100K Requirement 82 N Min | | Lash 200k Cycles Requirement 2.0 mm Max | |
|---|---|---|---|---|---|---|
| | Adjuster | | | | | |
| | Cap Retainer | Isolator | 6 mm Ball Stud | Tapered Pin | 6 mm Ball Stud | Tapered Pin |
| 165° C. Life Cycle | Part A Material 3 | Part B Material 2 | 6 Samples Avg = 115.36 N Max = 135.9 N Min = 96.1 N | | 6 Samples Avg = 1.52 mm Max = 1.76 mm Min = 1.28 mm | |
| | Part D Material 2 | Part A Material 1 | | 4 Samples Broke Retention Cap | | Testing Suspended |
| | Part A Material 3 | Part B Material 2 | | 3 Samples Avg = 90.6 N Max = 93.9 N Min = 85.0 N | | Avg = 2.02 mm Max = 2.10 mm Min = 1.98 mm |
| | Part E Material 3 | Part C Material 3 | | 4 Samples Avg = 42.1 N Max = 47.1 N Min = 30.8 N | | Testing Supended |

ATX High Temperature Development Test Matrix

| | | | | |
|---|---|---|---|---|
| Part E<br>Material 3 | Part D<br>Material 4 | 4 Samples<br>Avg = 60.4 N<br>Max = 72.5 N<br>Min = 43.3 N | Testing<br>Suspended | |
| Part F<br>Material 8 | Part D<br>Material 4 | 4 Samples<br>Avg = 87.2 N<br>Max = 100.6 N<br>Min = 79.5 N | Testing<br>Supended | |
| Part G<br>Material 8 | Part D<br>Material 4 | 8 Samples<br>Avg = 151.5 N<br>Max = 171.9 N<br>Min = 116.1 N | 8 Samples<br>Avg = 1.57 mm<br>Max = 1,66 mm<br>Min = 1.43 mm | |

ATX High Temperature Development Test Matrix

| | Adjuster | | Ball Stud Installation 200K Requirement 130 N Max | | Ball Stud Extraction 200K Requirement 82 N Max | | Strength 149° C. Straight Line Requirement No Permanent Deformation | |
|---|---|---|---|---|---|---|---|---|
| | Cap Retainer | Isolator | 6 mm Ball Stud | Tapered Pin | 6 mm Ball Stud | Tapered Pin | 6 mm Ball Stud | Tapered Pin |
| 165° C. Life Cycle | Pait A<br>Material 3 | Part B<br>Material 2 | 6 Samples<br>Avg = 50.1 N<br>Max = 60.5 N<br>Min = 37.8 N | | 6 Samples<br>Avg = 73.58 N<br>Max = 96.2 N<br>Min = 56.8 N | | | |
| | Part D<br>Material 2 | Part A<br>Material 1 | | | | | | |
| | Part A<br>Material 3 | Part B<br>Material 2 | | | | | | 1 Sample<br>Fail |
| | Port E<br>Material 3 | Part C<br>Material 3 | | | | | | |
| | Part E<br>Material 3 | Part D<br>Material 4 | | | | | | |
| | Part F<br>Material 8 | Part D<br>Material 4 | | | | | | |
| | Part G<br>Material 8 | Part D<br>Material 4 | 8 Samples<br>Avg = 71.4 N<br>Max = 88.0 N<br>Min = 53.9 N | | 8 Samples<br>Avg = 120.0 N<br>Max = 152.9 N<br>Min = 92.0 N | | | |

| | Adjuster | | Strength IV Routing 149° C. Requirement No Permanent Deformation | | Strength IV Routing 165° C. Requirement No permanent Deformation | |
|---|---|---|---|---|---|---|
| | Cap Retainer | Isolator | 6 mm Ball Stud | Tapered Pin | 6 mm Ball Stud | Tapered Pin |
| 165° C. Life Cycle | Part A<br>Material 3 | Part B<br>Matetial 2 | 30 Samples<br>Passed | | | |
| | Part D<br>Material 2 | Part A<br>Material 1 | | | | |
| | Part A<br>Material 3 | Part B<br>Material 2 | | 1 Sample<br>Fail | | 1 Sample<br>Fail |
| | Port E<br>Material 3 | Part C<br>Material 3 | | | | |
| | Part E<br>Material 3 | Part D<br>Material 4 | | | | |
| | Part F<br>Material 8 | Part D<br>Material 4 | | 3 Samples<br>Failed<br>worst case | | 2 Samples<br>Failed<br>worst case |
| | Part G<br>Material 8 | Part D<br>Material 4 | | | | 30 Samples<br>Passed |

In addition, dynamic efficiency testing was conducted in the manner described above, on a number of additional units of the transmission cable assemblies used for the testing shown in the above examples. Specifically, the dynamic efficiency of the cable assembly shown in the last row of the above table (i.e., Cap Retainer Part G, Material 8 and Isolator Part D, Material 4) was measured at 23° C. routing around Mandrel A-1 (as shown in FIG. 18) at three times during life cycle testing, specifically, before, during, and after a 200,000 cycle testing. More specifically, testing as follows was performed at zero cycles, at 100,000 cycles, and at 200,000 cycles. The cable assembly had a length between 850 mm and 1200 mm. The results were above the 40% Min. requirement of the test. Longer lengths tend to have lower efficiency. The cable assembly was routed securely in a standard testing fixture simulating a generic cable routing. A tensile load of 111N was applied at the transmission end of the cable perpendicular to the transmission end fitting. The shifter end of the cable was pulled perpendicular to the shifter end fitting at a rate of 15 cycles per minute, and the input load was recorded. The efficiency value was calculated as: (output load value divided by input load value)×100%. Passing the test requires that the cable be determined to maintain a minimum efficiency of 40% (i.e., to maintain an efficiency of at least 40%) throughout the 200,000 life cycle test. In the present example, the efficiency of the cable assemblies was determined to be:

Efficiency at 0 Cycles Average=84.5%
    Maximum=85.8%
    Minimum=83.5%
Efficiency at 100,000 Cycles Average=86.0%
    Maximum=87.5%
    Minimum=84.6%
Efficiency at 200,000 Cycles Average=87.8%
    Maximum=90.6%
    Minimum=82.5%

Although the present invention has been described above in terms of certain exemplary embodiments, it should be understood that other embodiment, other uses, alterations and modifications thereof will be apparent to those skilled in the art given the benefit of this disclosure. Thus, it will be appreciated that various modifications and alterations will be apparent from this disclosure to those skilled in the art, without departing from the spirit and scope of the invention as set forth in the following claims. Also, it is intended that the embodiments described above be interchangeable, e.g. one or more element of any of the embodiments may be interchanged with any of the elements of any other embodiment. It is also intended that the following claims be read as covering such alterations and modifications as fall within the true spirit and scope of the invention. It should be understood that the use of a singular indefinite or definite article (e.g., "a," "an," "the," etc.) in this disclosure and in the following claims follows the traditional approach in patents of meaning "at least one" unless in a particular instance it is clear from context that the term is intended in that particular instance to mean specifically one and only one. Likewise, the term "comprising" is open ended, not excluding additional items, features, components, etc.

What is claimed is:

1. An automotive transmission shift cable assembly comprising, in combination:
    a conduit subassembly comprising a conduit and a core wire extending through the conduit,
    a shifter end portion, and
    a transmission end portion,
wherein the conduit subassembly extends from the shifter end portion to the transmission end portion, and the transmission end portion comprises:
    a core wire length adjuster defining an isolator socket and comprising:
    a core wire adjuster isolator in the isolator socket, forming a bore having a connector pin socket portion and a retainer cap socket portion, the core wire adjuster isolator formed of materials selected from silicone, thermoplastic elastomer (TPE), thermoplastic polyester elastomer (TPEE), and polyester-type thermoplastic polyurethane compound, and
    a retainer cap configured to be partially received by the retainer cap socket of the core wire adjuster isolator and having a connector pin end socket configured to receive and engage a portion of a connector pin received into the connector pin socket portion of the core wire adjuster isolator, the retainer cap formed of materials selected from polyether imide thermoplastic (PEI), Nylon 6 thermoplastic (polyamide 6), Nylon 6/6 thermoplastic (polyimide 6/6), and
    a conduit end fitting comprising a conduit end fitting isolator formed of materials selected from thermoplastic elastomer (TPE), polymeric silicone compound, thermoplastic polyurethane elastomer (TPU), thermoplastic polyurethane elastomer (polyester) (TPU-polyester), and having a shear strength of at least 10 kN/meter; wherein a core wire travels less than a specified distance of 1.3 mm for core wires under 850 mm in length, less than 2.0 mm for core wires of from 850 to 1200 mm in length, less than 2.5 mm for core wires from 1200-2400 mm in length following 100,000 cycles of movement of the shift assembly and the core wire maintains a length after application of a compressive load of 667 N five times for a duration of 10 seconds followed by application of a compressive load of 333.8 N five times for a duration of 10 seconds.

2. The automotive transmission shift cable assembly or claim 1 wherein the connector pin socket portion when attached and removed to a connector pin requires an installation force of a maximum of 130 N and an extraction force of a minimum of 82 N following 100,000 cycles of movement of the shift.

3. The automotive transmission shift cable assembly of claim 1 wherein the core wire adjuster isolator comprises polyester-type thermoplastic polyurethane compound.

4. The automotive transmission shift cable assembly of claim 1 wherein the retainer cap comprises glass-filled Nylon 6/6.

5. The automotive transmission shift cable assembly of claim 1 wherein the conduit end fitting isolator comprises polymeric silicone.

6. The automotive transmission shift cable assembly of claim 1 wherein the core wire travels less than 1.3 mm for core wires under 850 mm in length, less than 2.0 mm for core wires of from 850 to 1200 mm in length, less than 2.5 mm for core wires from 1200-2400 mm in length following 200,000 cycles of movement of the shift assembly and wherein the connector pin socket portion when attached and removed to a connector pin requires an installation force a maximum of 130 N and an extraction force of a minimum of 82 N following 200,000 cycles of movement of the shift assembly.

7. The automotive transmission shift cable assembly of claim 1 wherein the conduit end fitting isolator is formed of polymeric silicone compound and the polymeric silicone compound of the conduit end fitting isolator substantially maintains its durometer at 165° C.

8. The automotive transmission shift cable assembly of claim 1 wherein the core wire adjuster isolator is formed of polyester-type thermoplastic polyurethane compound having a Shore Hardness of 62D ±3 measured by test method ASTM D-2240.

9. The automotive transmission shift cable assembly of claim 1 wherein the retainer cap is formed of 25%-50% glass-filled Nylon 6/6.

10. The automotive transmission shift cable assembly of claim 1 wherein the retainer cap is formed of 30%- 35% glass-filled Nylon 6/6.

11. The automotive transmission shift cable assembly of claim 1 further comprising a swivel tube and a wiper seal at the end of the swivel tube, the wiper seal is formed of thermoplastic elastomer which remains pliable and sealing up to a temperature of at least 165° C.

12. The automotive transmission shift cable assembly of claim 1 wherein the core wire adjuster isolator is formed of a polyester-type thermoplastic polyurethane compound having a Shore Hardness of 62D ±3 measured by test method ASTM D-2240 and the material includes a tensile strength of 27.9 MPa, a tensile modulus of 17.2 MPa at 100 percent elongation a tensile modulus of 27.6 MPa at 300 percent elongation, an ultimate elongation of 470 percent, a flexural modulus of 275.9 MPa at 23 degrees centigrade and a tear strength of 178.3.

13. The automotive transmission shift cable assembly of claim 12 wherein said polyester-type thermoplastic polyurethane compound of the core wire adjuster isolator has a glass transition temperature of negative 37 degrees centigrade and a Vicat softening point of 152 dgrees centigrade.

14. The automotive transmission shift cable assembly of claim 1 wherein the retainer cap is fanned of materials selected from polyether imide thermoplastic (PEI). Nylon 6 thermoplastic (polyamide 6), Nylon 6/6 thermoplastic (polyamide 6/6), the selected material having a tensile strength of approximately 25,000 psi, an elongation at break of 3.0%, an elongation at yield of 3.0% and a flexural modulus of 1,250,000 psi.

15. The automotive transmission shift cable assembly of claim 14 wherein said selected material of the retainer cap has a notched impact at 23 degrees C. of 2.0, a notched impact at −40 degrees C. of 2.2, a heat deflection temperature of 475 degrees F. at 264 psi, a heat deflection temperature of 260 degrees F. at 66 psi and a melting point of 495 degrees F.

16. The automotive transmission shift cable assembly of claim 15 wherein said material of the retainer cap comprises 30%-35% glass-filled Nylon 6/6.

17. The automotive transmission shift cable assembly of claim 1 wherein the retainer cap is configured to be received substantially concentrically by the retainer cap socket of the core wire adjuster isolator and further comprises a deflectable wall with configuration for securing a connector pin received into the connector pin socket of the core wire adjuster isolator.

18. An automotive transmission shift cable assembly comprising, in combination:
a conduit subassembly comprising a conduit and a core wire extending through and beyond the ends of the conduit,
a shifter end portion, and
a transmission end portion,
wherein the conduit subassembly extends from the shifter end portion to the transmission end portion, and the transmission end portion comprises:
a core wire length adjuster comprising:
a generally annular, soft plastic core wire adjuster isolator forming a central bore having a connector pin socket portion and a retainer cap socket portion, and comprising polyester-type thermoplastic polyurethane compound, and
a retainer cap configured to be partially received by the retainer cap socket of the core wire adjuster isolator and having a connector pin end socket configured to receive and engage a portion of a connector pin received into the connector pin socket portion of the core wire adjuster isolator, the retainer cap comprising 25%-50% glass-filled Nylon 6/6, wherein the retainer cap and the core wire adjuster isolator have corresponding configurations operative to interlock with each other when a connector pin is received into the connector pin socket portion of the core wire adjuster isolator and the connector pin end socket of the retainer cap, and
a conduit end fitting comprising:
a sleeve on an end portion of the conduit,
a conduit end fitting isolator over at least a portion of the sleeve and comprising a polymeric silicone compound,
a conduit end fitting cap over at least a portion of the isolator,
a conduit end fitting abutment over at least a portion of the conduit end fitting isolator and engaging the conduit end fitting cap, and
a swivel tube extending from within the conduit end fitting abutment and having a longitudinal bore into which the core wire extends toward the core wire length adjuster: and wherein a core wire travels less than 1.3 mm for core wires under 850 mm in length, less than 2.0 mm for core wires of from 850 to 1200 mm in length, less than 2.5 mm for core wires from 1200-2400 mm in length following 200,000 cycles of movement of the shift assembly, and wherein the connector pin socket portion when attached and removed to a connector pin requires an installation force of a maximum of 130 N and an extraction force of a minimum of 82 N following 200,000 cycles of movement of the shift assembly and the core wire maintains a length after application of a compressive load of 667 N five times for a duration of 10 seconds followed by application of a compressive load of 333.8 N five times for a duration of 10 seconds.

19. The automotive transmission shift cable assembly of claim 18 further comprising a wiper seal at the end of the swivel tube, the wiper seal comprising thermoplastic elastomer which remains pliable and sealing up to a temperature of at least 165° C.

* * * * *